(12) United States Patent
Kimura et al.

(10) Patent No.: US 9,960,983 B2
(45) Date of Patent: May 1, 2018

(54) MONITORING ITEM SELECTION METHOD AND DEVICE, AND STORAGE MEDIUM

(71) Applicant: HITACHI, LTD., Tokyo (JP)

(72) Inventors: Masaki Kimura, Tokyo (JP); Takahiro Yasui, Tokyo (JP); Norihiro Hara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 206 days.

(21) Appl. No.: 14/767,042

(22) PCT Filed: May 27, 2013

(86) PCT No.: PCT/JP2013/064606
§ 371 (c)(1),
(2) Date: Aug. 11, 2015

(87) PCT Pub. No.: WO2014/192054
PCT Pub. Date: Dec. 4, 2014

(65) Prior Publication Data
US 2016/0006633 A1    Jan. 7, 2016

(51) Int. Cl.
*H04L 12/26* (2006.01)
*H04L 29/06* (2006.01)
(Continued)

(52) U.S. Cl.
CPC ...... *H04L 43/0876* (2013.01); *G06F 11/3055* (2013.01); *H04L 41/08* (2013.01); *H04L 43/0823* (2013.01); *G06F 11/0709* (2013.01); *G06F 11/3006* (2013.01); *H04L 41/28* (2013.01); *H04L 63/02* (2013.01)

(58) Field of Classification Search
CPC .......................... H04L 67/1097; H04L 67/125
See application file for complete search history.

(56) References Cited

U.S. PATENT DOCUMENTS

2003/0229900 A1* 12/2003 Reisman ........... G06F 17/30873
725/87
2007/0050777 A1* 3/2007 Hutchinson ......... G06F 11/0709
718/104
(Continued)

FOREIGN PATENT DOCUMENTS

| JP | 2000-122879 A | 4/2000 |
| JP | 2006-018369 A | 1/2006 |
| JP | 2008-033725 A | 7/2006 |

*Primary Examiner* — Barbara B Anyan
(74) *Attorney, Agent, or Firm* — Volpe and Koenig, P.C.

(57) ABSTRACT

[Object]
A monitoring item selection method, device and a storage medium capable of simplifying operation and management of a system that frequently undergoes configuration changes are proposed.
[Solution]
Operation information concerning resources in the monitoring target device and nodes that run on the monitoring target device and make use of the resources to execute processing are periodically or randomly acquired from a monitoring target device. A relation between the nodes and a relation between the nodes and the resources based on the acquired operation information are extracted. Monitoring items of the monitoring target device are selected based on the operation information, the extracted relation between the nodes and relation between the nodes and the resources, and a predefined condition.

8 Claims, 30 Drawing Sheets

(51) Int. Cl.
  *G06F 11/07* (2006.01)
  *H04L 12/24* (2006.01)
  *G06F 11/30* (2006.01)

(56) References Cited

U.S. PATENT DOCUMENTS

| | | | |
|---|---|---|---|
| 2009/0066994 A1* | 3/2009 | Pothos | H04L 63/02 358/1.15 |
| 2011/0251807 A1* | 10/2011 | Rada | G01D 4/00 702/61 |
| 2014/0007204 A1* | 1/2014 | Branch | H04L 41/28 726/5 |
| 2014/0244879 A1* | 8/2014 | Myrah | G06F 13/409 710/300 |
| 2015/0236977 A1* | 8/2015 | Terayama | H04L 47/762 709/224 |

\* cited by examiner

FIG.4

| PROCESS ID | RESOURCE | ACQUISITION INFORMATION |
|---|---|---|
| 1 | /dev/sda | THROUGHPUT |
| 1 | /dev/sda | LATENCY |
| 1 | eth0 | THROUGHPUT |
| 1 | eth0 | LATENCY |
| 1 | CPU | UTILIZATION |
| 1 | MEMORY | USAGE |
| 2 | /dev/sda | THROUGHPUT |
| 2 | /dev/sda | LATENCY |

| CONDITION ID | IP ADDRESS | PORT NUMBER | PROCESS NAME |
|---|---|---|---|
| 1 | 192.168.1.3 | 80 | ARBITRARY |
| 2 | 192.168.2.4 | 20 or 21 | ftpd |
| 3 | ARBITRARY | ARBITRARY | important_process |

| PROCESS ID | PROCESS NAME | IP ADDRESS | PORT NUMBER | COMMUNICATION DESTINATION IP ADDRESS | COMMUNICATION DESTINATION PORT NUMBER | OPERATING HOST ID | UPDATE FLAG |
|---|---|---|---|---|---|---|---|
| 1 | database | 192.168.5.7 | 5432 | 192.168.2.4 | 55555 | 1 | NO UPDATE |
| 2 | backup.sh | 192.168.5.7 | - | - | - | 1 | NO UPDATE |
| 3 | important_process | 192.168.2.4 | 44444 | 192.168.1.3 | 443 | 2 | ADD |
| 3 | important_process | 192.168.2.4 | 55555 | 192.168.5.7 | 5432 | 2 | NO UPDATE |
| 4 | harmless.sh | 192.168.2.4 | 66666 | 192.168.1.3 | 80 | 2 | DELETE |
| 5 | java | 192.168.1.3 | 443 | 192.168.2.4 | 44444 | 3 | ADD |
| 46A | 46B | 46C | 46D | 46E | 46F | 46G | 46H |

| RESOURCE ID | ACCESS PROCESS ID | OPERATING HOST ID | RESOURCE TYPE | RESOURCE NAME | UPDATE FLAG |
|---|---|---|---|---|---|
| 1 | 1 | 1 | DISK | /dev/sda | NO UPDATE |
| 1 | 2 | 1 | DISK | /dev/sda | ADD |
| 2 | 1 | 1 | NETWORK | eth0 | NO UPDATE |
| 3 | 1 | 1 | CPU | cpu0 | NO UPDATE |
| 3 | 2 | 1 | CPU | cpu0 | NO UPDATE |
| 4 | 1 | 1 | MEMORY | memory0 | NO UPDATE |
| 4 | 2 | 1 | MEMORY | memory0 | NO UPDATE |
| 5 | 3 | 2 | DISK | /dev/sda | DELETE |
| 47A | 47B | 47C | 47D | 47E | 47F |

|  |  | PROCESS ID | | | | |
|---|---|---|---|---|---|---|
|  |  | 1 | 2 | 3 | 4 | 5 |
| PROCESS ID | 1 | 0 | 0 | 1 | 0 | 0 |
|  | 2 | 0 | 0 | 0 | 0 | 0 |
|  | 3 | 1 | 0 | 0 | 0 | 1 |
|  | 4 | 0 | 0 | 0 | 0 | 0 |
|  | 5 | 0 | 0 | 1 | 0 | 0 |

| PROCESS ID | REACHABLE RELATION TABLE 50A | | | | | UPDATE FLAG 50B | | | | |
|---|---|---|---|---|---|---|---|---|---|---|
| | PROCESS ID | | | | | PROCESS ID | | | | |
| | 1 | 2 | 3 | 4 | 5 | 1 | 2 | 3 | 4 | 5 |
| 1 | 1 | 0 | 1 | 0 | 1 | NO UPDATE | NO UPDATE | ADD | NO UPDATE | NO UPDATE |
| 2 | 0 | 1 | 0 | 0 | 0 | ADD | NO UPDATE | NO UPDATE | NO UPDATE | NO UPDATE |
| 3 | 1 | 0 | 1 | 0 | 1 | NO UPDATE | NO UPDATE | DELETE | NO UPDATE | NO UPDATE |
| 4 | 0 | 0 | 0 | 1 | 0 | NO UPDATE | DELETE | NO UPDATE | NO UPDATE | NO UPDATE |
| 5 | 1 | 0 | 1 | 0 | 1 | NO UPDATE | NO UPDATE | NO UPDATE | NO UPDATE | NO UPDATE |

| PROCESS ID | MATCHING CONDITION ID | MACHING CONDITION UPDATE FLAG |
|---|---|---|
| 3 | 3 | ADD |
| 5 | 1 | DELETE |
| 52AA | 52AB | 52AC |

52A(52)

(B)

| PROCESS ID | RELATION NODE ID | RELATION NODE UPDATE FLAG |
|---|---|---|
| 3 | 1 | NO UPDATE |
| 3 | 3 | NO UPDATE |
| 3 | 5 | ADD |
| 5 | 4 | DELETE |
| 52BA | 52BB | 52BC |

52B(52)

(C)

| PROCESS ID | RELATION NODE ID | INFLUENTIAL NODE ID | INFLUENTIAL NODE UPDATE FLAG |
|---|---|---|---|
| 3 | 5 | 2 | ADD |
| 5 | 4 | 4 | DELETE |
| 52CA | 52CB | 52CC | 52CD |

| RULE ID | RESOURCE TYPE | ACQUIRED ITEM |
|---|---|---|
| 1 | DISK | THROUGHPUT OF TARGET DISK |
| 2 | DISK | LATENCY OF TARGET DISK |
| 3 | NETWORK | THROUGHPUT OF TARGET DISK |
| 4 | CPU | UTILIZATION |
| 5 | MEMORY | USAGE |

| MONITORING ITEM ID | PROCESS ID | OPERATING HOST ID | RESOURCE ID | ACQUIRED ITEM | APPLICABLE RULE ID | MONITORING ITEM UPDATE FLAG |
|---|---|---|---|---|---|---|
| 1 | 1 | 1 | 1 | THROUGHPUT | 1 | NO UPDATE |
| 2 | 1 | 1 | 1 | LATENCY | 2 | NO UPDATE |
| 3 | 1 | 1 | 2 | THROUGHPUT | 3 | NO UPDATE |
| 4 | 1 | 1 | 3 | UTILIZATION | 4 | NO UPDATE |
| 5 | 1 | 1 | 4 | USAGE | 5 | NO UPDATE |
| 6 | 2 | 1 | 1 | THROUGHPUT | 1 | ADD |
| 7 | 2 | 1 | 2 | LATENCY | 2 | ADD |
| 8 | 2 | 1 | 3 | UTILIZATION | 4 | NO UPDATE |
| 9 | 2 | 1 | 3 | USAGE | 5 | NO UPDATE |
| 10 | 3 | 2 | 5 | THROUGHPUT | 1 | DELETE |
| 11 | 3 | 2 | 5 | LATENCY | 2 | DELETE |
| 54A | 54B | 54C | 54D | 54E | 54F | 54G |

| | | REACHABLE RELATION TABLE (50A) | | | | | | UPDATE FLAG (50B) | | | | | |
|---|---|---|---|---|---|---|---|---|---|---|---|---|---|
| | | PROCESS ID | | | | | | PROCESS ID | | | | | |
| | | 1 | 2 | 3 | 4 | 5 | 6 | 1 | 2 | 3 | 4 | 5 | |
| PROCESS ID | 1 | 1 | 0 | 1 | 0 | 1 | 1 | NO UPDATE | NO UPDATE | NO UPDATE | NO UPDATE | NO UPDATE | ADD |
| | 2 | 0 | 1 | 0 | 0 | 0 | 0 | NO UPDATE | NO UPDATE | NO UPDATE | NO UPDATE | NO UPDATE | NO UPDATE |
| | 3 | 1 | 0 | 1 | 0 | 1 | 1 | NO UPDATE | NO UPDATE | NO UPDATE | NO UPDATE | NO UPDATE | ADD |
| | 4 | 0 | 0 | 0 | 1 | 0 | 0 | NO UPDATE | NO UPDATE | NO UPDATE | NO UPDATE | NO UPDATE | NO UPDATE |
| | 5 | 1 | 0 | 1 | 0 | 1 | 1 | NO UPDATE | NO UPDATE | NO UPDATE | NO UPDATE | NO UPDATE | ADD |
| | 6 | 1 | 0 | 1 | 0 | 1 | 1 | NO UPDATE | NO UPDATE | ADD | NO UPDATE | ADD | ADD |

50AA  50BA  50

| | | REACHABLE RELATION TABLE | | | | | UPDATE FLAG | | | | |
|---|---|---|---|---|---|---|---|---|---|---|---|
| | | PROCESS ID | | | | | PROCESS ID | | | | |
| | | 1 | 2 | 3 | 4 | 5 | 1 | 2 | 3 | 4 | 5 |
| PROCESS ID | 1 | 1 | 0 | 1 | 0 | 1 | NO UPDATE | NO UPDATE | NO UPDATE | NO UPDATE | NO UPDATE |
| | 2 | 0 | 1 | 0 | 0 | 0 | NO UPDATE | NO UPDATE | NO UPDATE | NO UPDATE | NO UPDATE |
| | 3 | 1 | 0 | 1 | 0 | 1 | NO UPDATE | NO UPDATE | NO UPDATE | NO UPDATE | NO UPDATE |
| | 4 | 0 | 0 | 0 | 1 | 0 | NO UPDATE | NO UPDATE | NO UPDATE | NO UPDATE | NO UPDATE |
| | 5 | 1 | 0 | 1 | 0 | 1 | NO UPDATE | NO UPDATE | NO UPDATE | NO UPDATE | NO UPDATE |

FIG.24

|  | | PROCESS ID | | | | |
|---|---|---|---|---|---|---|
|  | | 1 | 2 | 3 | 4 | 5 |
| PROCESS ID | 1 | 1 | 0 | 1 | 0 | 1 |
|  | 2 | 0 | 1 | 0 | 0 | 0 |
|  | 3 | 1 | 0 | 1 | 0 | 1 |
|  | 4 | 0 | 0 | 0 | 1 | 0 |
|  | 5 | 1 | 0 | 1 | 0 | 1 |

| | | REACHABLE RELATION TABLE 50A | | | | | UPDATE FLAG 50B | | | | |
|---|---|---|---|---|---|---|---|---|---|---|---|
| | | PROCESS ID | | | | | PROCESS ID | | | | |
| | | 1 | 2 | 3 | 4 | 5 | 1 | 2 | 3 | 4 | 5 |
| PROCESS ID | 1 | 1 | 0 | 1 | 0 | 0 | NO UPDATE | NO UPDATE | NO UPDATE | NO UPDATE | DELETE |
| | 2 | 0 | 1 | 0 | 0 | 0 | NO UPDATE | NO UPDATE | NO UPDATE | NO UPDATE | NO UPDATE |
| | 3 | 1 | 0 | 1 | 0 | 0 | NO UPDATE | NO UPDATE | NO UPDATE | NO UPDATE | DELETE |
| | 4 | 0 | 0 | 0 | 1 | 0 | NO UPDATE | NO UPDATE | NO UPDATE | NO UPDATE | NO UPDATE |
| | 5 | 0 | 0 | 0 | 0 | 1 | DELETE | NO UPDATE | DELETE | NO UPDATE | NO UPDATE |

50AA   50BA   50

MONITORING ITEM SELECTION METHOD AND DEVICE, AND STORAGE MEDIUM

TECHNICAL FIELD

The present invention relates to a monitoring item selection method and device, as well as to a storage medium and, for instance, can be suitably applied to a monitoring system.

BACKGROUND ART

In order to stably operate a system, it is important to monitor the operating status of the system and detect a sign of failure. In order to improve the accuracy of failure sign detection, it is necessary to finely set the granularity of monitoring items (increase monitoring items), but there is a dilemma in that the monitoring items need to be reduced in order to suppress the system load resulting from the acquisition of information required for the failure sign detection and the computational effort required for such failure sign detection. In response to this kind of dilemma, conventionally, measures such as refining the granularity of monitoring items and subsequently narrowing down the monitoring items to important processes or processes that may cause a failure were taken.

In order to improve the accuracy of failure sign detection, while it is ideal to narrow down the monitoring items to optimal monitoring items in accordance with the system configuration, when the configuration frequently changes as in a cloud environment, it is difficult to manually narrow down the monitoring items each time the configuration is changed, and measures for dealing with this problem are being emphasized.

Note that PTL 1 discloses a method of automatically generating monitoring items by pre-defining rules of generating monitoring items, and applying rules to each monitoring target device.

CITATION LIST

Patent Literature

[PTL 1] Japanese Patent Application Publication No. 2008-033725

SUMMARY OF INVENTION

Technical Problem

However, according to the technology disclosed in PTL 1, knowledge of the monitoring target is required for defining rules, and there is also a problem in that much time and man-hours are required for defining such rules. Moreover, configuration-dependent rules need to be updated after the configuration change, and there is a problem in that PTL 1 is unable to deal with frequent configuration changes.

Accordingly, for instance, if it is possible to easily change the monitoring items pursuant to the configuration change of the monitoring target device, it is considered that the operation and management of systems, particularly those that frequently undergo configuration changes, can be simplified.

The present invention was devised in view of the foregoing points, and an object of this invention is to propose a monitoring item selection method and device, as well as a storage medium, capable of simplifying the operation and management of systems that frequently undergo configuration changes.

Solution to Problem

In order to achieve the foregoing object, the present invention provides a monitoring item selection method comprising a first step of periodically or randomly acquiring, from a monitoring target device, operation information related to resources in the monitoring target device and nodes that run on the monitoring target device and use the resources to execute processing, a second step of the monitoring item selection device extracting a relation between the nodes and a relation between the nodes and the resources based on the acquired operation information, and a third step of the monitoring item selection device selecting monitoring items of the monitoring target device based on the operation information, the extracted relation between the nodes and relation between the nodes and the resources, and a pre-defined condition.

Moreover, the present invention additionally provides a monitoring item selection device, comprising an operation information acquisition apparatus which periodically or randomly acquires, from a monitoring target device, operation information related to resources in the monitoring target device and nodes that run on the monitoring target device and use the resources to execute processing, a configuration comprehension unit which extracts a relation between the nodes and a relation between the nodes and the resources based on the acquired operation information; and a monitoring item selection unit which selects monitoring items of the monitoring target device based on the operation information, the extracted relation between the nodes and relation between the nodes and the resources, and a pre-defined condition.

Furthermore, the present invention additionally provides a storage medium storing a program for causing a monitoring item selection device, which selects monitoring items of a monitoring target device, to perform processing comprising a first step of periodically or randomly acquiring, from a monitoring target device, operation information related to resources in the monitoring target device and nodes that run on the monitoring target device and use the resources to execute processing, a second step of extracting a relation between the nodes and a relation between the nodes and the resources based on the acquired operation information; and a third step of selecting monitoring items of the monitoring target device based on the operation information, the extracted relation between the nodes and relation between the nodes and the resources, and a pre-defined condition.

According to the monitoring item selection method and device, as well as the storage medium, of the present invention described above, when there is any change in the relation between the nodes or the relation between the node and the resource in the monitoring target device, new monitoring items are selected according to the relation between the nodes or the relation between the node and the resource after the change without requiring any manual operation. Thus, monitoring items can be easily changed pursuant to the configuration change of the monitoring target device.

Advantageous Effects of Invention

According to the present invention, it is possible to simplify the operation and management of systems that frequently undergo configuration changes.

BRIEF DESCRIPTION OF DRAWINGS

FIG. 4 is a conceptual diagram showing the configuration of the monitoring item accumulation table.

FIG. 5 is a conceptual diagram showing the configuration of the source node condition table.

FIG. 6 is a conceptual diagram showing the configuration of the node operation information table.

FIG. 7 is a conceptual diagram showing the configuration of the resource access information table.

FIG. 8 is a conceptual diagram showing the configuration of the inter-node direct relation table.

FIG. 9 is a conceptual diagram showing the configuration of the inter-node reachable relation table.

FIG. 10(A) is a conceptual diagram showing the configuration of the selected source node table, FIG. 10(B) is a conceptual diagram showing the configuration of the selected relation node table, and FIG. 10(C) is a conceptual diagram showing the configuration of the selected influential node table.

FIG. 11 is a conceptual diagram showing the configuration of the monitoring location/item selection rule table.

FIG. 12 is a conceptual diagram showing the configuration of the monitoring item table.

FIG. 20 is a conceptual diagram explaining the inter-node reachable relation addition processing.

FIG. 24 is a conceptual diagram explaining the inter-node reachable relation deletion processing.

FIG. 25 is a conceptual diagram explaining the inter-node reachable relation deletion processing.

DESCRIPTION OF EMBODIMENTS

An embodiment of the present invention is now explained in detail with reference to the drawings.

(1) Configuration of Monitoring System in this Embodiment

Figure 1:
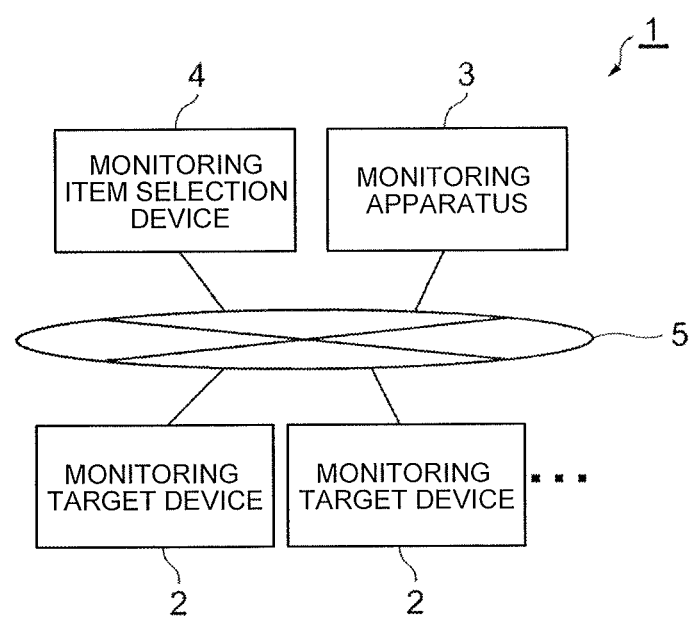
FIG. 1 is a block diagram showing the overall configuration of the monitoring system according to this embodiment.

In FIG. 1, reference numeral 1 indicates, as a whole, a monitoring system according to this embodiment. The monitoring system 1 is configured by a plurality of monitoring target devices 2, a monitoring apparatus 3, and a monitoring item selection device 4 being mutually connected via a network 5.

Figure 2:
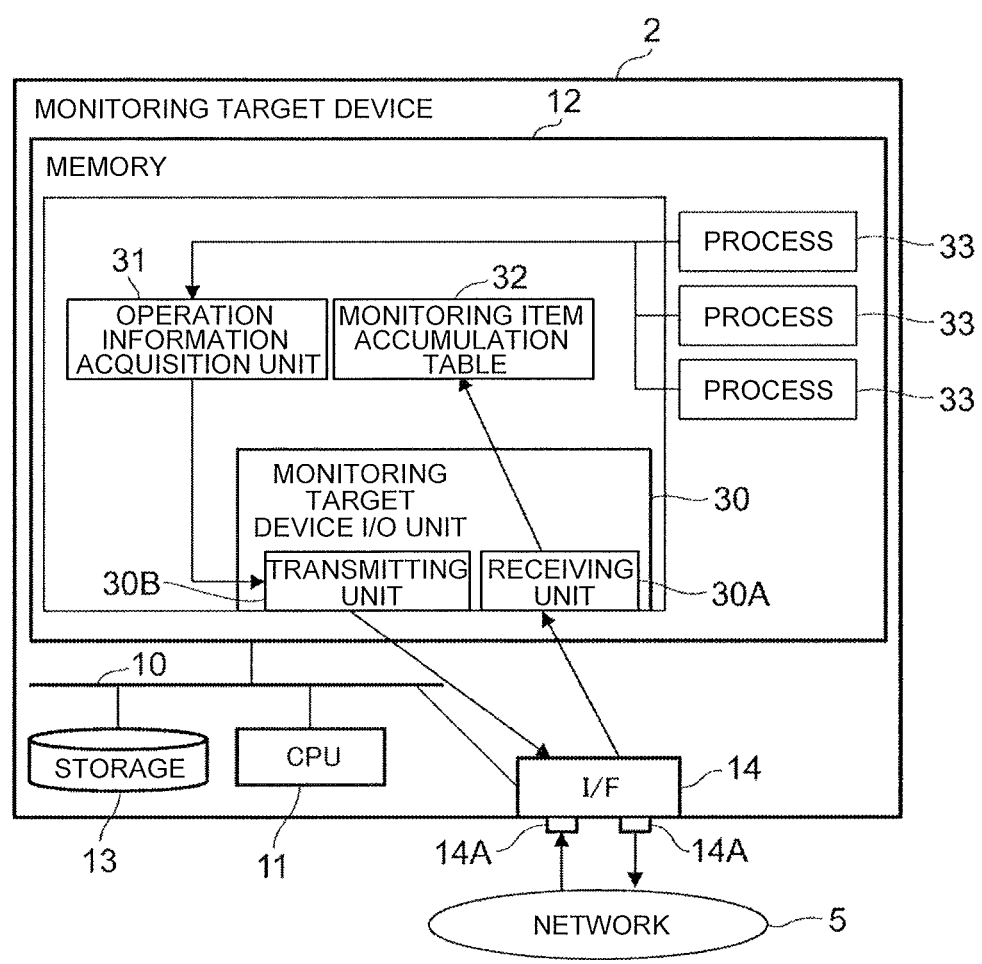
FIG. 2 is a block diagram showing the schematic configuration of the monitoring target device.

The monitoring target device 2 is, for example, a computer such as a database server or an application server or a client, and is configured by comprising, as shown in FIG. 2, a CPU (Central Processing Unit) 11, a memory 12, a storage apparatus 13 and a network interface 14 that are mutually connected via an internal bus 10.

The CPU 11 is a processor that governs the operational control of the overall monitoring target device 2. Moreover, the memory 12 is configured, for example, from a volatile memory or the like, and is used for storing various programs and various data. The storage apparatus 13 is configured, for example, from a nonvolatile large-capacity storage device such as a hard disk device. The programs and data stored in the storage apparatus 13 are read into the memory 12 when the monitoring target device 2 is activated or as needed, and various types of processing are executed by the monitoring target device 2 as a result of the CPU 11 executing the programs that were read into the memory 12.

The network interface 14 is a physical interface that performs protocol conversion during communication with the monitoring apparatus 3, the monitoring item selection device 4, or other communication equipment such as a client (not shown) via the network 5, and is configured, for example, from an NIC (Network Interface Card) or the like. The network interface 14 comprises one or more physical ports for connecting the monitoring target device 2 to the network 5, and a unique address (hereinafter referred to as the IP (Internet Protocol) address) on the network 5 is assigned to each of the ports 14A. Moreover, each port 14A is managed by being assigned a unique port number.

The monitoring apparatus 3 is a computer having a function of monitoring the operating status of the respective monitoring target devices 2. The monitoring apparatus 3 collects operating information from each of the monitoring target devices 2 via the network 5, and monitors the monitoring items notified from the monitoring item selection device 4 as described later regarding the operating status of these monitoring target devices 2 based on the collected operation information.

Figure 3:
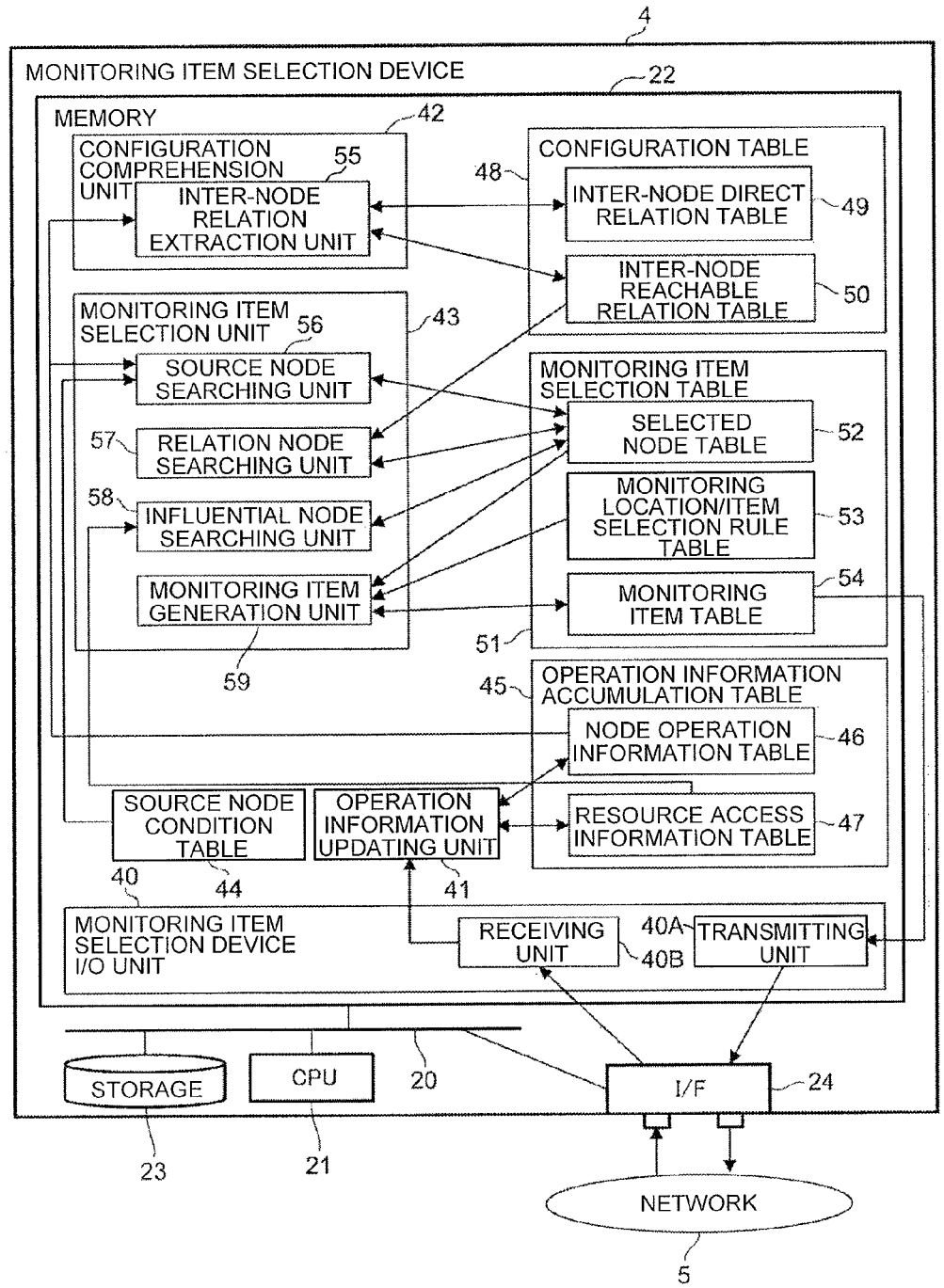
FIG. 3 is a block diagram showing the schematic configuration of the monitoring item selection device.

Meanwhile, the monitoring item selection device 4 is a server device having a function of selecting the monitoring items of the monitoring target device 2, and notifying the selected monitoring items to the monitoring apparatus 3, and is configured by comprising, as shown in FIG. 3, a CPU 21, a memory 22, a storage apparatus 23 and a network interface 24 that are mutually connected via an internal bus 20.

The CPU 21 is a processor that governs the operational control of the overall monitoring item selection device 4. Moreover, the memory 22 is configured, for example, from a volatile memory or the like, and is used for storing various programs and various data. The storage apparatus 23 is configured, for example, from a nonvolatile large-capacity storage device such as a hard disk device. The programs and data stored in the storage apparatus 23 are read into the memory 22 when the monitoring item selection device 4 is activated or as needed, and various types of processing are executed by the monitoring item selection device 4 as a result of the CPU 21 executing the programs that were read into the memory 22.

The network interface 24 is a physical interface that performs protocol conversion during communication with the monitoring target device 2 or the monitoring apparatus 3 via the network 5, and is configured, for example, from an NIC or the like.

(2) Monitoring Item Selection Function

The monitoring item selection function loaded in the monitoring item selection device 4 is now explained. The monitoring item selection device 4 is equipped with a monitoring item selection function of respectively extracting a source node, a relation node and an influential node from the operating status of the monitoring target device 2, and selecting the monitoring items of the monitoring target device 2 based on the extraction result as a result of taking particular note of the relation between the processes operating on the monitoring target device 2 and the relation (access relation) between the processes and resources.

Here, a source node refers to a process that corresponds to a condition that is pre-defined by the user, and a relation node refers to a process that is related to the source node. In the case of this embodiment, there is a "relation" when the process is communicating with the source node via the network 5, and such a process becomes a relation node of the source node. Note that, in the ensuing explanation, when the source node and the relation node are communicating via the network 5, it shall mean that the source node and the relation node have a "direct relation". Moreover, in this embodiment, a process that is communicating with the relation node via the network 5 is also treated as a relation node. In the ensuing explanation, the relation between a relation node having a "relation" with the relation node and the source node is referred to as an "indirect relation".

Moreover, an influential node refers to a resource that exerts influence on the source node and the relation node. In the case of this embodiment, a process that is using the same resource as the source node and the relation node is referred to as a process "that exerts influence on the source node and the relation node", and this kind of process becomes the influential node of the source node and the relation node.

As means for realizing the monitoring item selection function according to this embodiment described above, as shown in FIG. 2, a monitoring target device I/O unit 30 and an operation information acquisition unit 31 are stored as programs and a monitoring item accumulation table 32 is stored as a table in the memory 12 of the respective monitoring target devices 2.

The monitoring target device I/O unit 30 is a program for executing reception processing and transmission processing of commands and data to be input/output via the network interface 14, and is configured from a receiving unit 30A for executing reception processing and a transmitting unit 30B for executing transmission processing.

Moreover, the operation information acquisition unit 31 is a program having a function of collecting the operation information of the host monitoring target device 2. The operation information acquisition unit 31 acquires processes 33 and required operation information from an OS (Operating System) or hardware, and periodically or randomly sends the acquired operation information to the monitoring item selection device 4.

The monitoring item accumulation table 32 is a table that is used for storing, in the monitoring target device 2, the monitoring items selected by the monitoring item selection device 4. The monitoring target device 2 collects the operation information related to the monitoring items registered in the monitoring item accumulation table 32, and sends the collected operation information to the monitoring apparatus 3.

The monitoring item accumulation table 32 is configured, as shown in FIG. 4, a process ID column 32A, a resource column 32B and an acquisition information column 32C. Among the above, the process ID column 32A stores the process ID of the processes 33 that runs in the host monitoring target device 2, and the resource column 32B stores the name of the resource that is being used by the corresponding process 33. Moreover, the acquisition information column 32C stores the type of operation information to be acquired regarding the corresponding resource.

Accordingly, the example illustrated in FIG. 4 shows that, for instance, "throughput" of the resource of "/dev/sda" that is being used by the process 33 assigned with the process ID of "1" should be acquired as the operation information.

Meanwhile, as shown in FIG. 3, the memory 22 of the monitoring item selection device 4 stores, as programs, a monitoring item selection device I/O unit 40, an operation information updating unit 41, a configuration comprehension unit 42 and a monitoring item selection unit 43, and stores, as tables, a source node condition table 44, a node operation information table 46 and a resource access information table 47 that configure an operation information accumulation table 45, an inter-node direct relation table 49 and an inter-node reachable relation table 50 that configure a configuration table 48, and a selected node table 52, a monitoring location/item selection rule table 53 and a monitoring item table 54 that configure a monitoring item selection table 51.

The monitoring item selection device I/O unit 40 is a program for executing reception processing and transmission processing of commands and data to be input/output via the network interface 24, and is configured from a receiving unit 40A for executing reception processing and a transmitting unit 40B for executing transmission processing.

The operation information updating unit 41 is a program having a function of updating the node operation information table 46 and the resource access information table 47 based on the operation information of each monitoring target device 2 that is periodically sent from such monitoring target device 2 when the configuration of the monitoring target process or resource of the monitoring target device 2 is changed.

The configuration comprehension unit 42 is a program for comprehending the configuration of the monitoring target device 2, and comprises an inter-node relation extraction unit 55. The inter-node relation extraction unit 55 is a program having a function of extracting the relation between the respective updated processes 33 (FIG. 2) when the node operation information table 46 or the resource access information table 47 is updated by the operation information updating unit 41. The inter-node relation extraction unit 55 extracts the process 33 to become the source node in the monitoring target device after the configuration change and the relation between the respective processes 33, and updates the inter-node direct relation table 49 and the inter-node reachable relation table 50 based on the extraction result as needed.

The monitoring item selection unit 43 is configured by comprising a source node searching unit 56, a relation node searching unit 57, an influential node searching unit 58 and a monitoring item generation unit 59.

The source node searching unit 56 is a program having a function of referring to the source node condition table 44 and searching for a source node to be added or a source node to be deleted (searching for a process 33 to newly become a source node or a process 33 to no longer become a source node) when the node operation information table 46 is updated by the operation information updating unit 41. The source node searching unit 56 updates the selected node table 52, as needed, based on the search result of the foregoing search.

Moreover, the relation node searching unit 57 is a program having a function of referring to the inter-node reachable relation table 50 and the selected node table 52, searching for a relation node to be added or deleted pursuant to the addition or deletion of the source node searching unit 56, and updating the selected node table 52 based on the search result.

In addition, the influential node searching unit 58 is a program having a function of referring to the resource access information table 47 and the selected node table 52, searching for an influential node to be added or deleted pursuant to the addition or deletion of the source node or the relation node, and updating the selected node table 52 based on the search result.

In addition, the monitoring item generation unit 59 is a program having a function of generating (deciding) new monitoring items based on the updated selected node table 52 and monitoring location/item selection rule table 53. The new monitoring items generated by the monitoring item generation unit 59 are notified to the respective monitoring target devices 2 by the transmitting unit 40B of the monitoring item selection device I/O unit 40 via the network 5.

Meanwhile, the source node condition table 44 is a table that is used for managing the condition of the process 33, which is pre-set by the user, for causing such process 33 to become the source node (this is hereinafter referred to as the "source node condition"), and is configured from, as shown in FIG. 5, a condition ID column 44A, an IP address column 44B, a port number column 44C and a process name column 44D.

The condition ID column 44A stores an identifier (condition ID) that is assigned to the corresponding source node condition and which is unique to that source node condition, and, when the source node condition prescribes that a process running on the monitoring target device 2 assigned with a specific IP address should be used as the source node, the IP address column 44B stores that IP address.

Moreover, when the corresponding source node condition prescribes that the process 33 communicating via the port 14A (FIG. 2) of a specific port number of the monitoring target device 2 assigned with the foregoing specific IP address should be used as the source node, the port number column 44C stores that port number, and, when the corresponding source node condition prescribes that a specific process 33 should be used as the source node, the process name column 44D stores the process name of that process 33.

Note that, when the corresponding source node condition does not prescribe that the process 33 to be used as the source node should be associated with a specific IP address or should be communicating via a port 14A of a specific port number and/or should be a process 33 of a specific process name, the IP address column 44B, the port number column 44C and/or the process name column 44D will store information ("Arbitrary" in FIG. 5) meaning that the IP address, the port number and/or the process name has not been specified.

Accordingly, the example illustrated in FIG. 5 shows that the source node condition of "1" is a condition where the process 33 that is running on the monitoring target device 2 assigned with an IP address of "192.168.1.3" and communicating via a port 14A with a port number of "80" should be used as the source node.

The node operation information table 46 is a table that is used for storing and retaining operation information related to the respective processes 33 running on the monitoring target device 2 among the operation information that is periodically sent from the monitoring target device 2 as described above, and is configured from, as shown in FIG. 6, a process ID column 46A, a process name column 46B, an IP address column 46C, a port number column 46D, a communication destination IP address column 46E, a communication destination port number column 46F, an operating host ID column 46G and an update flag column 46H.

The process ID column 46A stores the identifier (process ID) of each process 33 running on the monitoring target device 2, and the process name column 46B stores the process name of the corresponding process 33. Moreover, the IP address column 46C stores the IP address of the monitoring target device 2 on which the corresponding process 33 is running, and the port number column 46D stores the port number of the port 14A (FIG. 2) in the host monitoring target device 2 to be used when the corresponding process 33 is to communicate with an external device.

Moreover, when the corresponding process 33 is communicating with a process 33 running on another monitoring target device 2, the communication destination IP address column 46E stores the IP address of the monitoring target device 2 on which the communication destination process 33 is running, and the communication destination port number column 46F stores the port number of the communication destination port 14A in the communication destination monitoring target device 2. In addition, the operating host ID column 46G stores the identifier (host ID) of the monitoring target device 2 on which the corresponding process 33 is running.

The update flag column 46H stores a flag (update flag) representing whether there was a configuration change related to the corresponding process 33. In the foregoing case, the update flag is set to "No change" when there is no change to the configuration related to the corresponding process 33, set to "Add" when the configuration related to the corresponding process 33 has been changed, and set to "Delete" when the corresponding process 33 has been deleted. This update flag is used in the course of performing the processing of updating the monitoring item table 54 and other tables pursuant to the change in the configuration of the monitoring target device 2.

Accordingly, the example illustrated in FIG. 6 shows that the process 33 having a process ID of "1" has a process name of "database", the host ID of the monitoring target device 2 on which that process 33 is running is "1", the IP address is "192.168.5.7", and communication with a process running on the monitoring target device 2 having an IP address of "192.168.2.4" is being performed via a port 14A of the communication source monitoring target device 2 having a port number of "5432", and via a port 14A in the communication destination monitoring target device 2 having a port number of "55555".

The resource access information table 47 is a table that is used for storing and retaining operation information related to the resources in the monitoring target device 2 among the operation information that is periodically sent from the monitoring target device 2 as described above, and is configured from, as shown in FIG. 7, a resource ID column 47A, an access process ID column 47B, an operating host ID column 47C, a resource type column 47D, a resource name column 47E and an update flag column 47F.

The resource ID column 47A stores the identifier (resource ID) of the corresponding resource, and the access process ID column 47B stores the process ID of the process 33 that accesses such resource (uses such resource). Moreover, the operating host ID column 47C stores the host ID of the monitoring target device 2 that is equipped with the corresponding resource, and the resource type column 47D stores the type of such resource (disk, network, CPU, memory or the like). In addition, the resource name column 47E stores the name (resource name) of the corresponding resource, and the update flag column 47F stores the same update flag as the update flag of the node operation information table 46.

Accordingly, the example illustrated in FIG. 7 shows that the resource assigned with the resource ID of "1" is a "disk" that is accessed by the process 33 assigned with a process ID of "1" and having a resource name of "/dev/sda" that is equipped in the monitoring target device 2 assigned with the host ID of "1".

Moreover, the inter-node direct relation table 49 is a table that is used for managing whether there is a direct relation between the respective processes 33 running on the respective monitoring target devices 2, and, as shown in FIG. 8, is configured as a bitmap of a tournament chart format in which the process ID of all processes 33 running on the respective monitoring target devices 2 is enumerated at the uppermost line in the row direction and at the leftmost end in the column direction.

Each column 49A of the inter-node direct relation table 49 stores a flag, and the flag is set to "1" when there is a direct relation between the process 33 associated with the row including that column 49A and the process 33 associated with the column including that column 49A, and set to "0" when there is no direct relation.

Accordingly, the example illustrated in FIG. 8 shows that, for instance, the process 33 having a process ID of "1" has a direct relation with the process 33 having a process ID of "3", and the process 33 having a process ID of "2" has no direct relation with any of the processes 33.

The inter-node reachable relation table 50 is a table that is used for managing the direct and indirect relations between the respective processes 33 running on the respective monitoring target devices 2. The inter-node reachable relation table 50 is configured from, as shown in FIG. 9, a reachable relation column 50A and an update flag column 50B.

The reachable relation column 50A is configured as a bitmap having the same configuration as the inter-node direct relation table 49. Each column 50AA of the reachable relation column 50A stores a flag, and the flag is set to "1" when the process 33 associated with a row including that column 50AA and the process 33 associated with the column including that column 50AA have a direct or indirect relation, and set to "0" when there is no direct or indirect relation.

Moreover, the update flag column 50B also has the same tournament chart format configuration as the reachable relation column 50A. Each column 50BA of the update flag column 50B stores an update flag, and the update flag is set to a value representing whether there was a change in the direct or indirect relation between the process 33 associated with a row including that column 50BA and the process 33 associated with the column including that column 50BA pursuant to the configuration change of the process 33 or the resource.

Specifically, when there is no change in the direct or indirect relation between the process 33 associated with a row including that column 50BA and the process 33 associated with the column including that column 50BA, the update flag of that column 50BA is set to "No change", and when there is a new direct or indirect relation between the processes 33 pursuant to the configuration change of the process 33 or the resource, the update flag of that column 50BA is set to "Add". Furthermore, when the direct or indirect relation between the process 33 associated with a row including that column 50BA and the process 33 associated with the column including that column 50BA no longer exists pursuant to the configuration change of the process 33 or the resource, the update flag of that column 50BA is set to "Delete". These update flags are used in the course of performing the processing of updating the monitoring item table 54 and other tables pursuant to the change in the configuration of the monitoring target device 2.

Accordingly, the example illustrated in FIG. 9 shows that, for example, the process 33 having a process ID of "1" has a direct or indirect relation with the respective processes 33 having a process ID of "1", "3" and "5", and the process 33 having a process ID of "2" has a direct or indirect relation only with the process 33 having a process ID of "2".

The selected node table 52 is configured from a selected source node table 52A shown in FIG. 10(A), a selected relation node table 52B shown in FIG. 10(B), and a selected influential node table 52C shown in FIG. 10(C).

Among the above, the selected source node table 52A is a table that is used for managing the processes 33 selected as a source node, and is configured from, as shown in FIG. 10(A), a process ID column 52AA, a matching condition ID column 52AB and a matching condition update flag column 52AC.

The process ID column 52AA stores the process ID of each process 33 that was selected as the source node, and the matching condition ID column 52AB stores the condition ID of the source node condition (refer to FIG. 5) with which the corresponding process 33 matches.

Moreover, when there is a configuration change to the corresponding process 33, the matching condition update flag column 52AC stores a flag representing whether that process 33 should still be used as the source node (this is hereinafter referred to as the "matching condition update flag"). In effect, the matching condition update flag is set to "No update" when that process 33 should still be used as the source node, and set to "Delete" when that process 33 should no longer be used as the source node. In addition, the matching condition update flag is set to "Add" when that process 33 should be used as a new source node. The matching condition update flag is used in the course of performing the processing of updating the monitoring item table 54 and other tables pursuant to the change in the configuration of the monitoring target device 2.

Accordingly, the example illustrated in FIG. 10(A) shows the process 33 having a process ID of "3" is a newly added source node that matches the source node condition of "3".

Moreover, the selected relation node table 52B is a table that is used for managing the processes 33 selected as a relation node, and is configured from, as shown in FIG. 10(B), a process ID column 52BA, a relation node ID column 52BB and a relation node update flag column 52BC.

The process ID column 52BA stores the process ID of the process 33 that was selected as the source node, and the relation node ID column 52BB stores the process ID of the process 33 to become the relation node of the corresponding source node that was detected by the relation node searching unit 57 (FIG. 3).

Moreover, when the configuration of the monitoring target device 2 is changed, the relation node update flag column 52BC stores a flag representing whether the corresponding process 33 should still be used as the relation node (this is hereinafter referred to as the "relation node update flag"). The relation node update flag is set to "No update" when that process 33 should still be used as the relation node, and set to "Delete" when that process 33 should no longer be used as the relation node. In addition, the relation node update flag is set to "Add" when that process 33 should be used as a new relation node. The relation node update flag is used in the course of performing the processing of updating the monitoring item table 54 and other tables pursuant to the change in the configuration of the monitoring target device 2.

Accordingly, the example illustrated in FIG. 10(B) shows that the process 33 having a process ID of "3" has a direct relation with the processes 33 having a process ID of "1", "3" and "5", and among the above the "relation" with the process ID of "5" has been newly added.

The selected influential node table 52C is a table that is used for managing the processes 33 selected as the influential node, and is configured from, as shown in FIG. 10(C), a process ID column 52CA, a relation node ID column 52CB, an influential node ID column 52CC and an influential node update flag column 52CD.

The influential node ID column 52CC stores the process ID of the process 33 selected as the influential node, and the relation node ID column 52CC stores the process ID of the process 33 to become the relation node of that influential node (that is, the process 33 that accesses the same resource as the influential node). Moreover, the process ID column 52CA stores the process ID of the process 33 to become the source node of that relation node.

In addition, when the configuration of the monitoring target device 2 is changed, the influential node update flag column 52CD stores a flag representing whether the corresponding process 33 should still be used as the influential node (this is hereinafter referred to as the "influential node update flag"). The influential node update flag is set to "No update" when that resource should still be used as the influential node, and set to "Delete" when that resource should no longer be used as the influential node. In addition, the influential node update flag is set to "Add" when that resource should be used as a new influential node. The influential node update flag is used in the course of performing the processing of updating the monitoring item table 54 and other tables pursuant to the change in the configuration of the monitoring target device 2.

Accordingly, the example illustrated in FIG. 10(C) shows that the process having a process ID of "2" is the influential node of the process 33 which is a source node having a process ID of "3", and the process 33 which is a relation node having a process ID of "5".

The monitoring location/item selection rule table 53 is a table that is used for storing and retaining a pre-set rule that prescribes the monitoring location/item for each resource (this is hereinafter referred to as the "monitoring location/item selection rule"), and is configured from, as shown in FIG. 11, a rule ID column 53A, a resource type column 53B and an acquisition item column 53C.

The rule ID column 53A stores the identifier (rule ID) that is assigned to each monitoring location/item selection rule, and the resource type column 53B stores the type of such resource (disk, network, CPU, memory or the like) to be subject to the monitoring location/item selection rule. Moreover, the acquisition item column 53C stores the monitoring item that is prescribed in the corresponding monitoring location/item selection rule.

Accordingly, the example illustrated in FIG. 11 shows that the monitoring location/item selection rule to which the rule ID of "1" is assigned is a rule of causing "Throughput of target disk" to be the monitoring item for "disk" resources.

The monitoring item table 54 is a table that is used for managing the monitoring target selected by the monitoring item generation unit 59, and is configured from, as shown in FIG. 12, a monitoring item ID column 54A, a process ID column 54B, an operating host ID column 54C, a resource ID column 54D, an acquisition item column 54E, an applicable rule ID column 54F and a monitoring item update flag column 54G.

The monitoring item ID column 54A stores the identifier (monitoring item ID) that is assigned to the corresponding monitoring item, and the process ID column 54B stores the process ID of the process 33 that is related to that monitoring item. Moreover, the operating host ID column 54C stores the host ID of the monitoring target device 2 on which that process 33 is running.

Moreover, the resource ID column 54D stores the resource ID of the resource to be subject to that monitoring item, and the acquisition item column 54E stores the item for which the operation information should be acquired regarding that resource. In addition, the applicable rule ID column 54F stores the rule ID of the corresponding monitoring location/item selection rule among the monitoring location/item selection rules that are being managed in the monitoring location/item selection rule table 53.

In addition, pursuant to the configuration change of the corresponding monitoring target device 2, the monitoring item update flag column 54G stores a flag representing whether the corresponding monitoring item should still be selected as the monitoring item (this is hereinafter referred to as the "monitoring item update flag"). In effect, the monitoring item update flag is set to "No update" when that monitoring item should still selected as the monitoring item, and set to "Delete" when that monitoring item should no longer be selected as the monitoring item. In addition, the monitoring item update flag is set to "Add" when that monitoring item was newly generated (selected) as a monitoring item. The monitoring item update flag is used in the course of performing the processing of updating the monitoring item table 54 and other tables pursuant to the change in the configuration of the monitoring target device 2.

Accordingly, the example illustrated in FIG. 12 shows that the monitoring item having a monitoring item ID of "1" is a monitoring item to which the monitoring location/item selection rule assigned with a rule ID of "1" was applied, and that "throughput" of the resource ("disk" in this case) which is assigned with a resource ID of "1" and accessed by the process 33 assigned with a process ID of "1" running on the monitoring target device 2 assigned with a host ID of "1" should be used as the monitoring item.

(3) Various Processing Related to Monitoring Item Selection Function

The contents of the various types of processing that are executed in relation to the monitoring item selection function according to this embodiment are now explained. Note that, in the ensuing explanation, the processing entity of the various types of processing is explained as a "program ( . . . unit)", it goes without saying that, in effect, the CPU 11 (FIG. 2) of the monitoring target device 2 or the CPU 21 (FIG. 3) of the monitoring item selection device 4 executes the processing based on such program.

Figure 13:
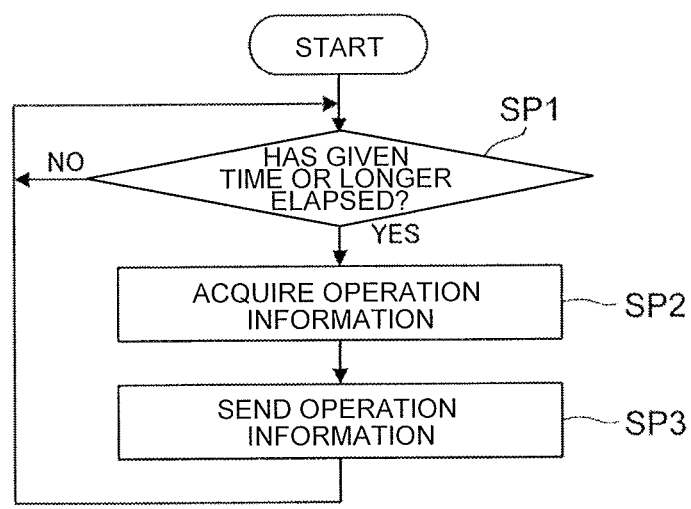
FIG. 13 is a flowchart showing the processing routine of the operation information transmission processing.

(3-1) Various Processing in Monitoring Target Device
(3-1-1) Operation Information Transmission Processing FIG. 13 shows the processing routine of the operation information transmission processing that is executed by the operation information acquisition unit 31 (FIG. 2) of each monitoring target device 2. The operation information acquisition unit 31 periodically acquires operation information of the host monitoring target device 2 and sends the acquired operation information to the monitoring item selection device 4 according to the processing routine shown in FIG. 13.

In effect, when the operation information acquisition unit 31 starts the operation information acquisition processing shown in FIG. 13, the operation information acquisition unit 31 foremost determines whether a given time or longer has elapsed from the last time that the operation information of the host monitoring target device 2 was sent to the monitoring item selection device 4 (SP1).

When a given time or longer has elapsed from the last time that the operation information of the host monitoring target device 2 was sent to the monitoring item selection device 4, the operation information acquisition unit 31 acquires the required operation information from the process 33 (FIG. 2), OS, hardware or the like (SP2), and sends the acquired operation information to the monitoring item selection device 4 via the transmitting unit 30B (FIG. 2) of the monitoring target device I/O unit 30 (FIG. 2) (SP2). Thereafter, the operation information acquisition unit 31 returns to step SP1, and thereafter repeats the same processing.

(3-1-2) Monitoring Item Information Reception Processing

Figure 14:
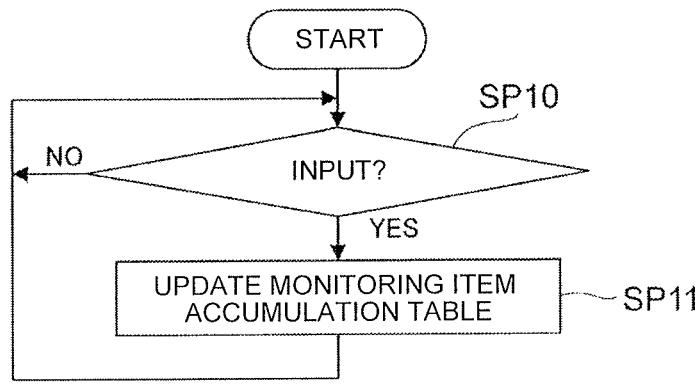
FIG. 14 is a flowchart showing the processing routine of the monitoring item information reception processing.

FIG. 14 shows the processing routine of the monitoring item information reception processing that is executed by the receiving unit 30A of the monitoring target device I/O unit 30 of the monitoring target device 2.

The receiving unit 30A waits to receive the foregoing monitoring item information to be sent from the monitoring item selection device 4 (SP10), and upon eventually receiving the monitoring item information, the monitoring item accumulation table 32 (FIG. 4) is updated based on the received monitoring item information (SP11). Thereafter, the receiving unit 30A returns to step SP10, and thereafter repeats the same processing.

Figure 15:
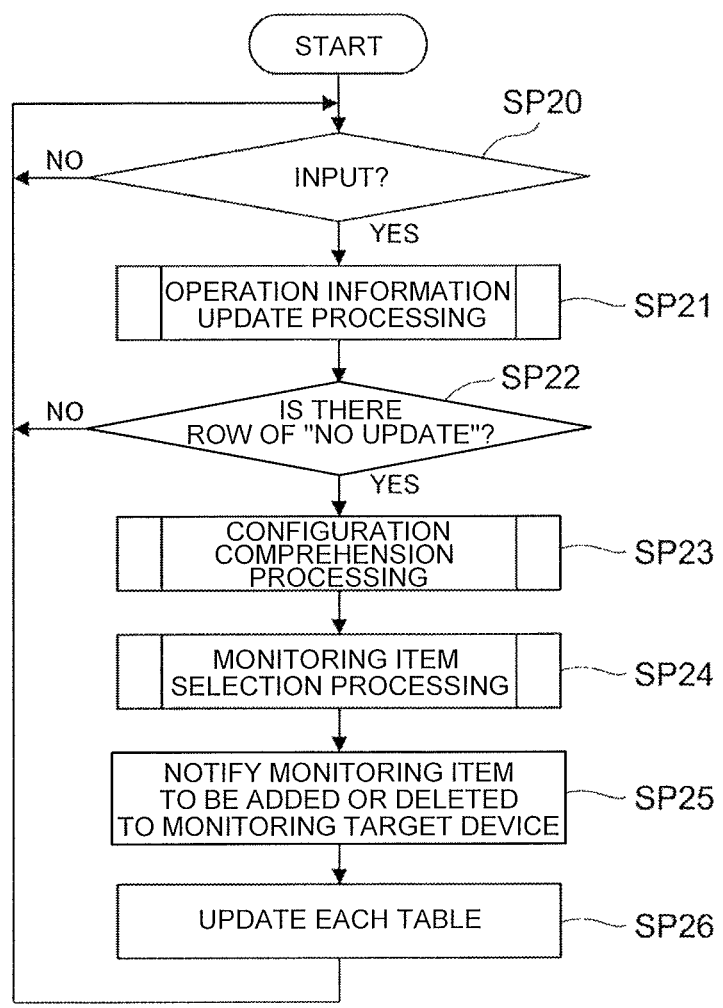
FIG. 15 is a flowchart showing the processing routine of the monitoring item selection overall processing.

(3-2) Various Processing in Monitoring Item Selection Device
(3-2-1) Processing Flow in Monitoring Item Selection Device Meanwhile, FIG. 15 shows the flow of the monitoring item selection overall processing that is executed in the monitoring item selection device 4. The monitoring item selection device 4 selects monitoring items according to the flow of FIG. 15, and notifies the selected monitoring items to the monitoring apparatus 3 and the monitoring target device 2.

In effect, when the power of the monitoring item selection device 4 is turned on, the monitoring item selection overall processing is started, and the monitoring item selection device I/O unit 40 (FIG. 3) waits for operation information to be sent from the monitoring target device 2 (SP20). Subsequently, when operation information is sent from any one of the monitoring target devices 2, the monitoring item selection device I/O unit 40 transfers the received operation information to the operation information updating unit 41 (FIG. 3).

When the operation information updating unit 41 receives the operation information that was transferred from the monitoring item selection device I/O unit 40, the operation information updating unit 41 updates, as needed, the node operation information table 46 (FIG. 6) and the resource access information table 47 (FIG. 7) of the operation information accumulation table 45 based on the received operation information (SP21).

Thereafter, the inter-node relation extraction unit 55 of the configuration comprehension unit 42 refers to the node operation information table 46, and determines whether there is an entry (row) storing an update flag other than "No update" in any one of the update flag columns 46H (FIG. 6) of the node operation information table 46 (SP22).

To obtain a positive result in this determination means that there was some kind of configuration change related to the process 33 in the monitoring target device 2 that sent the operation information. Consequently, in the foregoing case the inter-node relation extraction unit 55 updates the inter-node direct relation table 49 (FIG. 8) and the inter-node reachable relation table 50 (FIG. 9) of the configuration table 48 according to the updated contents of the node operation information table 46 that was updated by the operation information updating unit 41 (SP23).

Next, the monitoring item selection unit 43 selects the monitoring items to be monitored thereafter based on the updated node operation information table 46 and the resource access information table 47, and the monitoring location/item selection rule table 53 (FIG. 11), the updated inter-node direct relation table 49 and the inter-node reachable relation table 50, and updates the monitoring item table 54 (FIG. 12) based on the selection result (SP24).

Specifically, in step SP24, the source node searching unit 56 of the monitoring item selection unit 43 searches for a process to become the source node based on the node operation information table 46 and the source node condition table 44, and updates the selected source node table 52A (FIG. 10(A)), as needed, based on the search result.

Moreover, the relation node searching unit 57 searches for a relation node of each source node detected by the source node searching unit 56 based on the updated selected source node table 52A and the updated inter-node reachable relation table 50, and updates the selected relation node table 52B (FIG. 10(B)), as needed, based on the search result.

In addition, the influential node searching unit 58 searches for an influential node of the relation node detected by the relation node searching unit 57 based on the updated selected relation node table 52B and the updated resource access information table 47, and updates the selected influential node table 52C (FIG. 10(C)) based on the search result.

Furthermore, the monitoring item generation unit 59 selects the monitoring items to be monitored thereafter based on the updated selected relation node table 52B, the resource access information table 47 and the monitoring location/item selection rule table 53, and updates the monitoring item table 54 based on the selection result.

Thereafter, the monitoring item selection device I/O unit 40 sends, to the corresponding monitoring target device 2, information related to the monitoring items registered in the monitoring item table 54 (SP25), and the operation information updating unit 41, the inter-node relation extraction unit 55, the source node searching unit 56, the relation node searching unit 57, the influential node searching unit 58 and the monitoring item generation unit 59 respectively update the corresponding node operation information table 46, resource access information table 47, inter-node reachable relation table 50, selected node table 52, and monitoring item table 54 (SP26).

Specifically, in step SP26, the operation information updating unit 41 deletes the entries in which the update flag is set to "Delete" in the node operation information table 46 and the resource access information table 47, and, with regard to the entries in which "Add" is set to the update flag, updates such update flag to "No change".

Moreover, the inter-node relation extraction unit 55 updates all update flags in the update flag column 50B of the inter-node reachable relation table 50, which are set to "Delete" or "Add", to "No update".

In addition, the source node searching unit 56, the relation node searching unit 57 and the influential node searching unit 58 deletes the entries in which the matching condition update flag, the relation node update flag or the influential node update flag is set to "Delete" in the corresponding selected source node table 52A, selected relation node table 52B or selected influential node table 52C, and, with regard to the entries in which "Add" is set to the matching condition update flag, the relation node update flag or the influential node update flag, updates such matching condition update flag, relation node update flag or influential node update flag to "No change".

In addition, the monitoring item generation unit 59 deletes the entries in which "Delete" is set to the monitoring item update flag of the monitoring item table 54, and, with regard to the entries in which "Add" is set to the monitoring item update flag, updates such monitoring item update flag to "No change".

When the series of processing described above is complete, the monitoring item selection device 4 ends the monitoring item selection overall processing.

(3-2-2) Processing of Operation Information Updating Unit

Figure 16:
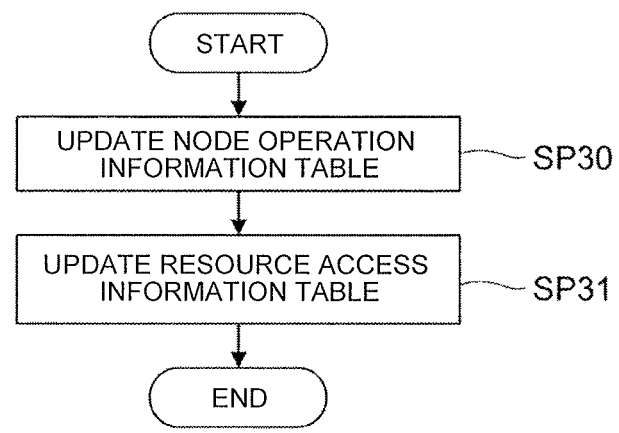
FIG. 16 is a flowchart showing the processing routine of the operation information update processing.

FIG. 16 shows the processing routine of the operation information update processing that is executed by the operation information updating unit 41 (FIG. 3) in step SP21 of the monitoring item selection overall processing (FIG. 15) described above.

When operation information sent from any one of the monitoring target device 2 is transferred from the monitoring item selection device I/O unit 40, the operation information updating unit 41 starts the operation information update processing shown in FIG. 16, and foremost updates the node operation information table 46, as needed, based on the transferred operation information (SP30).

Specifically, the operation information updating unit 41 extracts the host ID of the monitoring target device, which sent the operation information, from that operation information, and executes the following processing regarding all entries of the node operation information table 46 in which the same operating host ID as the extracted host ID is stored in the operating host ID column 46G (FIG. 6).

(A) Set the update flag to "No update" regarding entries in which the information related to one process 33 included in the operation information completely matches the registration information.

(B) When there is no entry in which the information related to one process 33 included in the operation information completely matches the registration information, add a new entry to the node operation information table 46, register the information of that process 33 in that entry, and set "Add" to the update flag of that entry.

(C) With regard to entries that do not correspond to either (A) or (B) above, set the update flag to "Delete".

As a result of performing the foregoing processing, when the process 33 running on the monitoring target device 2 is deleted or the communication destination of that process 33 is changed, the update flag of the entry in the node operation information table 46 corresponding to that process 33 is set to "Delete", and when a new process 33 is to be run on the monitoring target device 2 is added, an entry corresponding to that process 33 is added to the node operation information table 46, and the update flag of that entry is set to "Add".

Next, the operation information updating unit 41 updates the resource access information table 47 based on the transferred operation information (SP31).

Specifically, the operation information updating unit 41 performs the following processing regarding all entries of the resource access information table 47 in which the same operating host ID as the host ID extracted from the operation information in step SP30 is stored in the operating host ID column.

(A) Set the update flag to "No update" regarding entries in which the information related to one resource included in the operation information completely matches the registration information.

(B) When there is no entry in which the information related to one resource included in the operation information completely matches the registration information, add a new entry to the resource access information table 4, register the information of that resource in that entry, and set "Add" to the update flag of that entry.

(C) With regard to entries that do not correspond to either (A) or (B) above, set the update flag to "Delete".

As a result of performing the foregoing processing, when the resource of the monitoring target device 2 is deleted, the update flag of the entry in the resource access information table 47 corresponding to that resource is set to "Delete", and when a new resource is added to the monitoring target device 2, an entry corresponding to that resource is added to the resource access information table 47, and the update flag of that entry is set to "Add".

The operation information updating unit 41 thereafter ends the operation information update processing.

Figure 17:
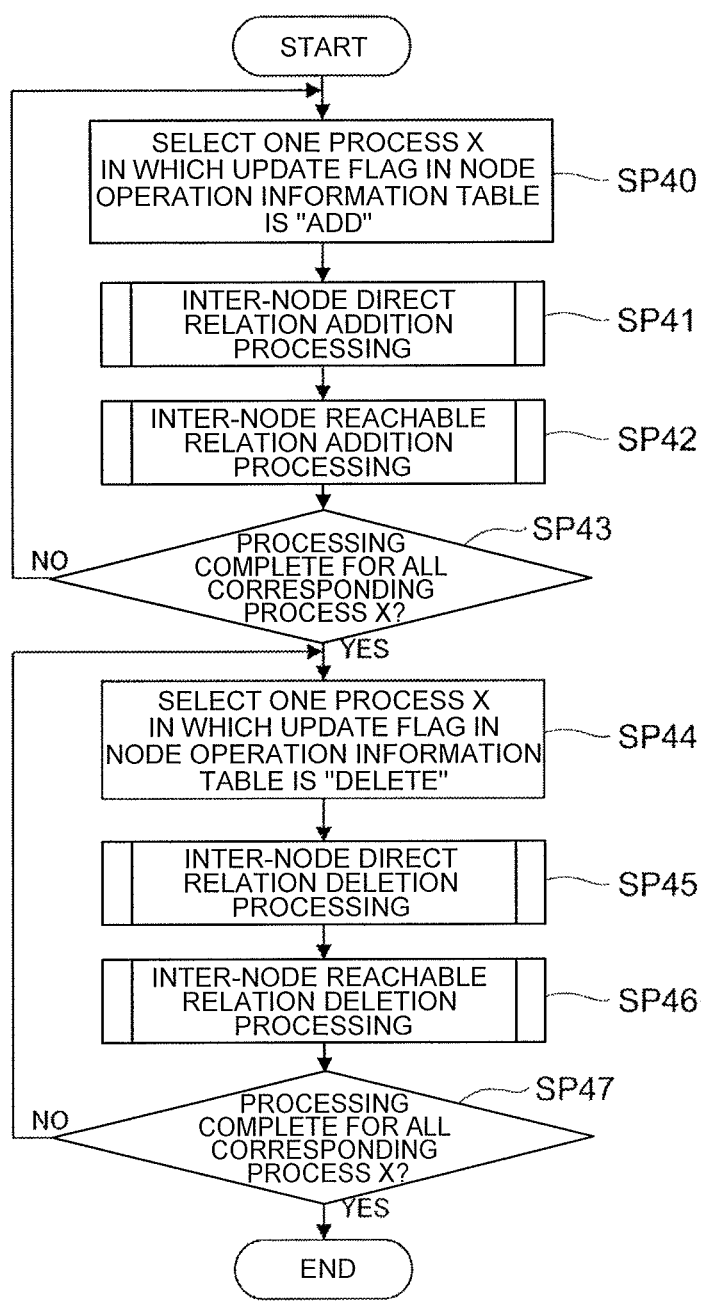
FIG. 17 is a flowchart showing the processing routine of the configuration comprehension processing.

(3-2-3) Processing of Configuration Comprehension Unit (3-2-3-1) Configuration Comprehension Processing Meanwhile, FIG. 17 shows the processing routine of the configuration comprehension processing that is executed by the inter-node relation extraction unit 55 (FIG. 3) in step SP 23 of the monitoring item selection overall processing (FIG. 15) described above.

The inter-node relation extraction unit 55 periodically starts the configuration comprehension processing shown in FIG. 17, and foremost selects one unprocessed process 33 in which the update flag is set to "Add" (this is hereinafter referred to as the "addition target process") among the processes 33 registered in the node operation information table 46 (SP40).

Next, the inter-node relation extraction unit 55 searches for a process 33 from the node operation information table 46 to communicate with the addition target process selected in step SP40 via the network 5 (FIG. 1), and updates the inter-node direct relation table 49 based on the search result (SP41).

Moreover, the inter-node relation extraction unit 55 refers to the inter-node direct relation table 46 that was updated in step SP41, searches for processes 33 having a direct or an indirect relation with the addition target process 33 that was selected in step SP40, and updates the inter-node reachable relation table 50 based on the search result (SP42).

Thereafter, the inter-node relation extraction unit 55 determines whether the execution of processing of step SP41 and step SP42 has been completed regarding all addition target processes 33 registered in the node operation information table 46 (SP43). When the inter-node relation extraction unit 55 obtains a negative result in this determination, the inter-node relation extraction unit 55 returns to step SP40, and thereafter repeats the processing of step SP40 to step SP43.

When the inter-node relation extraction unit 55 obtains a positive result in step SP43 as a result of eventually completing the execution of processing of step SP41 and step SP42 regarding all addition target processes 33 registered in the node operation information table 46, the inter-node relation extraction unit 55 selects one unprocessed process 33 in which the update flag is set to "Delete" (this is hereinafter referred to as the "deletion target process") among the processes registered in the node operation information table 46 (SP44).

Next, the inter-node relation extraction unit 55 searches, from the node operation information table 46, for processes 33 having a direct relation with the deletion target process 33 that was selected in step SP44, and updates the inter-node direct relation table 49 based on the search result (SP45).

Moreover, the inter-node relation extraction unit 55 searches the processes 33 having a direct or an indirect relation with the deletion target process 33 that was selected in step SP44 by using the inter-node direct relation table 49 that was updated in step SP45, and updates the inter-node reachable relation table 50 based on the search result (SP46).

Thereafter, the inter-node relation extraction unit 55 determines whether the execution of processing of step SP45 and step SP46 has been completed regarding all deletion target processes 33 registered in the node operation information table 46 (SP47). When the inter-node relation extraction unit 55 obtains a negative result in this determination, the inter-node relation extraction unit 55 returns to step S44P, and thereafter repeats the processing of step SP44 to step SP47.

When the inter-node relation extraction unit 55 obtains a positive result in step SP47 as a result of eventually completing the execution of processing of step SP45 and step SP46 regarding all deletion target processes 33 registered in the node operation information table 46, the inter-node relation extraction unit 55 ends the configuration comprehension processing.

(3-2-3-2) Inter-Node Direct Relation Addition Processing

Figure 18:
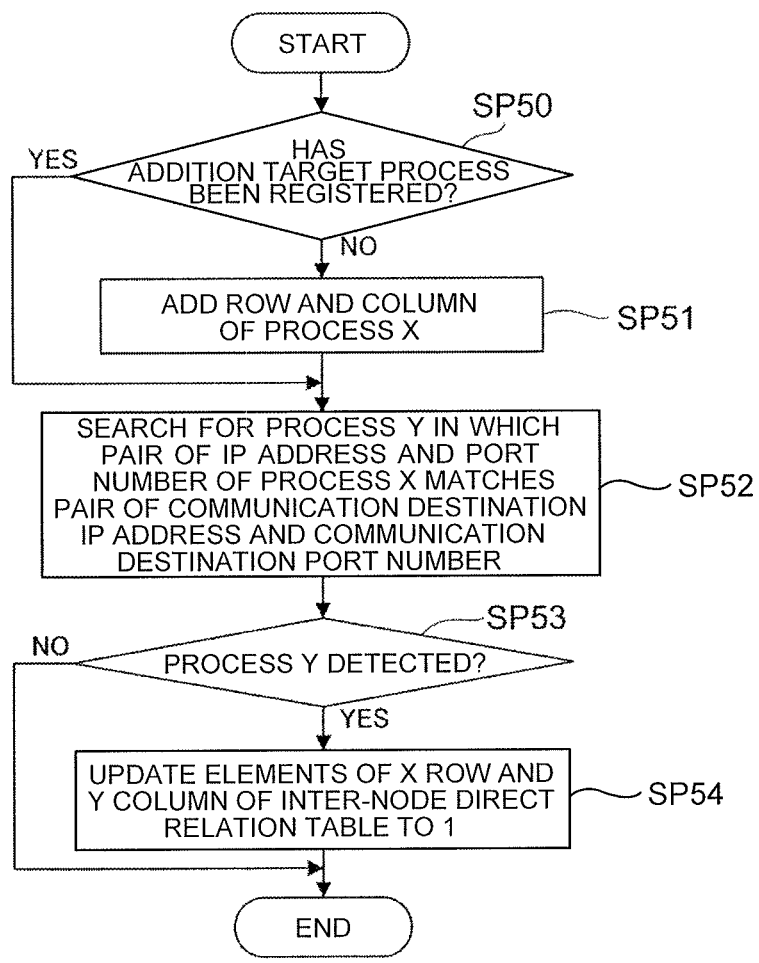
FIG. 18 is a flowchart showing the processing routine of the inter-node direct relation addition processing.

FIG. 18 shows the processing routine of the inter-node direct relation addition processing that is executed by the inter-node relation extraction unit 55 in step SP41 of the configuration comprehension processing (FIG. 17) described above.

When the inter-node relation extraction unit 55 proceeds to step SP41 of the configuration comprehension processing, the inter-node relation extraction unit 55 starts the inter-node direct relation addition processing shown in FIG. 18, and foremost refers to the inter-node direct relation table 49, and determines whether the relevant addition target process 33 has been registered in the inter-node direct relation table 49 (SP50).

When the inter-node relation extraction unit 55 obtains a positive result in this determination, the inter-node relation extraction unit 55 proceeds to step SP52.

Meanwhile, when the inter-node relation extraction unit 55 obtains a negative result in the determination of step SP50, the inter-node relation extraction unit 55 adds a row and a column corresponding to the relevant addition target process 33 to the inter-node direct relation table 49, and fills all columns 49A (FIG. 8) in the added row and column with "0" (SP51).

Next, the inter-node relation extraction unit 55 searches, from the node operation information table 46, processes 33 that are communicating with the relevant addition target process 33 via the network 5 (SP52). Specifically, the inter-node relation extraction unit 55 searches for processes 33 in which the pair of the IP address and the port number of the relevant addition target process 33 matches the pair of the IP address stored in the communication destination IP address column 46E (FIG. 6) and the port number stored in the communication destination port number column 46F (FIG. 6) among the processes 33 registered in the node operation information table 46.

Thereafter, the inter-node relation extraction unit 55 determines whether it was possible to detect a corresponding process 33 as a result of the search performed in step SP52 (SP53). When the inter-node relation extraction unit 55 obtains a negative result in this determination, the inter-node relation extraction unit 55 ends the inter-node relation addition processing and returns to the configuration comprehension processing.

Meanwhile, when the inter-node relation extraction unit 55 obtains a positive result in the determination of step SP53, with regard to all processes 33 that were detected in the search performed in step SP52, the inter-node relation extraction unit 55 updates the flag (flag of X row, Y column) located at the intersection of the column (Y column) corresponding to that process 33 and the row (X row) corresponding to the relevant addition target process 33 to "1" among the respective flags stored in the respective columns 49A of the inter-node direct relation table 49 (SP54).

The inter-node relation extraction unit 55 thereafter ends the inter-node direct relation addition processing and returns to the configuration comprehension processing.

(3-2-3-3) Inter-Node Reachable Relation Addition Processing

The inter-node direct relation addition processing that is executed by the inter-node relation extraction unit 55 in step SP42 of the configuration comprehension processing (FIG. 17) is now explained. Prior to this explanation, the method of detecting the processes 33 having a direct or an indirect relation with the addition target process 33 is foremost explained.

The reachable matrix is foremost explained. For example, the inter-node direct relation table 49 of FIG. 8 can be converted into an adjacency matrix X that is represented with the following formula:

[Math 1]

$$X = \begin{pmatrix} 0 & 0 & 1 & 0 & 0 \\ 0 & 0 & 0 & 0 & 0 \\ 1 & 0 & 0 & 0 & 1 \\ 0 & 0 & 0 & 0 & 0 \\ 0 & 0 & 1 & 0 & 0 \end{pmatrix} \quad (1)$$

Furthermore, the reachable matrix X' of the adjacency matrix X can be obtained as a matrix in which the product of adding a unit matrix I to the adjacency matrix X is raised, but the value of the matrix will not change irrespective of the number of times that the foregoing product is raised, as represented with the following formula. However, the operation of the matrix shall be performed via Boolean operation:

[Math 2]

$$X' = (X+I)^{(n+1)} = (X+I)^n \neq (X+I)^{(n-1)} \quad (2)$$

Accordingly, the reachable matrix X' of the adjacency matrix X of formula (1) is calculated according to the following formula:

[Math 3]

$$X' = \left(\begin{pmatrix} 0 & 0 & 1 & 0 & 0 \\ 0 & 0 & 0 & 0 & 0 \\ 1 & 0 & 0 & 0 & 1 \\ 0 & 0 & 0 & 0 & 0 \\ 0 & 0 & 1 & 0 & 0 \end{pmatrix} + \begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}\right)^3 \quad (3)$$

$$\left(\begin{pmatrix} 0 & 0 & 1 & 0 & 0 \\ 0 & 0 & 0 & 0 & 0 \\ 1 & 0 & 0 & 0 & 1 \\ 0 & 0 & 0 & 0 & 0 \\ 0 & 0 & 1 & 0 & 0 \end{pmatrix} + \begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}\right)^2 = \begin{pmatrix} 1 & 0 & 1 & 0 & 1 \\ 0 & 1 & 0 & 0 & 0 \\ 1 & 0 & 1 & 0 & 1 \\ 0 & 0 & 0 & 1 & 0 \\ 1 & 0 & 1 & 0 & 1 \end{pmatrix} \neq$$

$$\left(\begin{pmatrix} 0 & 0 & 1 & 0 & 0 \\ 0 & 0 & 0 & 0 & 0 \\ 1 & 0 & 0 & 0 & 1 \\ 0 & 0 & 0 & 0 & 0 \\ 0 & 0 & 1 & 0 & 0 \end{pmatrix} + \begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}\right)^1 = \begin{pmatrix} 1 & 0 & 1 & 0 & 0 \\ 0 & 1 & 0 & 0 & 0 \\ 1 & 0 & 1 & 0 & 1 \\ 0 & 0 & 0 & 1 & 0 \\ 0 & 0 & 1 & 0 & 1 \end{pmatrix}$$

Consequently, the following formula is obtained:

[Math 4]

$$X' = \begin{pmatrix} 1 & 0 & 1 & 0 & 1 \\ 0 & 1 & 0 & 0 & 0 \\ 1 & 0 & 1 & 0 & 1 \\ 0 & 0 & 0 & 1 & 0 \\ 1 & 0 & 1 & 0 & 1 \end{pmatrix} \quad (4)$$

Here, the i, j elements of X' of the reachable matrix represented as $X_{ij}'$ represent whether the process i can reach the process j through those that are related to the process j. In other words, when the process i can reach the process j (when there is a direct or an indirect relation), the i, j elements are "1", and when the process i cannot reach the process j (when there is no direct or indirect relation), the i, j elements are "0".

Accordingly, based on formula (4), it can be understood that the process 1 has a direct or an indirect relation with the processes 1, 3 and 5, and the process 2 has a direct or an indirect relation only with the process 2.

In light of the above, in this embodiment, by converting the inter-node direct relation table 49 updated in the foregoing inter-node direct relation addition processing (FIG. 18) into an adjacency matrix and obtaining the reachable matrix of that adjacency matrix, the processes 33 having a direct or an indirect relation with the addition target process 33 are detected, and the inter-node reachable relation table 50 is updated based on the detection result.

Figure 19:
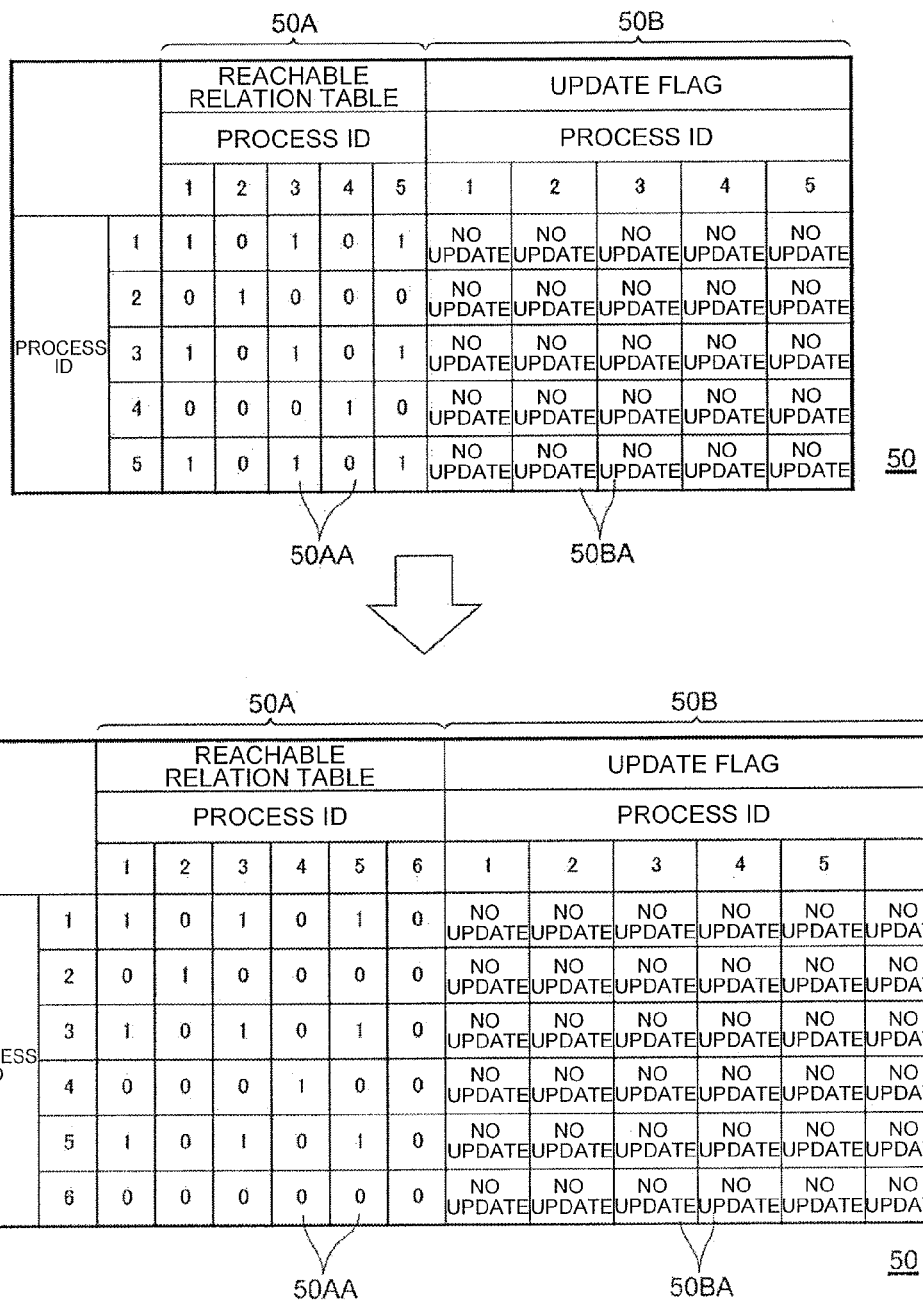
FIG. 19 is a conceptual diagram explaining the inter-node reachable relation addition processing.

Specifically, for instance, when the relevant addition target process 33 has not been registered in the inter-node reachable relation table 50, as shown in FIG. 19, a row and a column associated with that addition target process 33 are respectively added to the reachable relation column 50A and the update flag column 50B of the inter-node reachable relation table 50. Note that FIG. 19 shows a case where the node ID of the addition target process 33 is "6". Subsequently, all flags stored in the respective columns 50AA in the row and column added to the reachable relation column 50A are set to "0", and all update flags stored in the respective columns 50BA in the row and column added to the update flag column 50B are set to "No update".

Thereafter, the part of the reachable relation column 50A of the inter-node reachable relation table 50 is converted into an adjacency matrix A represented with the following formula:

[Math 5]

$$A = \begin{pmatrix} 1 & 0 & 1 & 0 & 1 & 0 \\ 0 & 1 & 0 & 0 & 0 & 0 \\ 1 & 0 & 1 & 0 & 1 & 0 \\ 0 & 0 & 0 & 1 & 0 & 0 \\ 1 & 0 & 1 & 0 & 1 & 0 \\ 0 & 0 & 0 & 0 & 0 & 0 \end{pmatrix} \quad (5)$$

Furthermore, in order to obtain a matrix of an addition result of adding a unit matrix upon reflecting the processing result of the inter-node direct relation addition processing, the respective elements of the X row, Y column and Y row, X column, and the diagonal elements, in the adjacency matrix A of formula (5) are updated to "1" as represented in the following formula:

[Math 6]

$$A = \begin{pmatrix} 1 & 0 & 1 & 0 & 1 & 0 \\ 0 & 1 & 0 & 0 & 0 & 0 \\ 1 & 0 & 1 & 0 & 1 & 1 \\ 0 & 0 & 0 & 1 & 0 & 0 \\ 1 & 0 & 1 & 0 & 1 & 0 \\ 0 & 0 & 1 & 0 & 0 & 1 \end{pmatrix} \quad (6)$$

Note that formula (6) shows an example where the relevant addition target process 33 is communicating with a process 33 having a node ID of "3" via the network 5.

Next, a matrix $A_n$ is sequentially obtained by calculating $A_{n-1} \times A$ relative to the matrix A, and the reachable matrix of the matrix A is obtained based on the foregoing result. For example, the value of the matrix $A_1$ is represented with the following formula:

[Math 7]

$$A_1 = A_0 \times A = \begin{pmatrix} 1 & 0 & 1 & 0 & 1 & 0 \\ 0 & 1 & 0 & 0 & 0 & 0 \\ 1 & 0 & 1 & 0 & 1 & 1 \\ 0 & 0 & 0 & 1 & 0 & 0 \\ 1 & 0 & 1 & 0 & 1 & 0 \\ 0 & 0 & 1 & 0 & 0 & 1 \end{pmatrix} \quad (7)$$

Meanwhile, the value of the matrix $A_2$ is represented with the following formula:

[Math 8]

$$A_2 = A_1 \times A = \begin{pmatrix} 1 & 0 & 1 & 0 & 1 & 1 \\ 0 & 1 & 0 & 0 & 0 & 0 \\ 1 & 0 & 1 & 0 & 1 & 1 \\ 0 & 0 & 0 & 1 & 0 & 0 \\ 1 & 0 & 1 & 0 & 1 & 1 \\ 0 & 0 & 1 & 0 & 1 & 1 \end{pmatrix} \neq A_1 \quad (8)$$

Furthermore, the value of the matrix $A_3$ is represented with the following formula:

[Math 9]

$$A_3 = A_2 \times A = \begin{pmatrix} 1 & 0 & 1 & 0 & 1 & 1 \\ 0 & 1 & 0 & 0 & 0 & 0 \\ 1 & 0 & 1 & 0 & 1 & 1 \\ 0 & 0 & 0 & 1 & 0 & 0 \\ 1 & 0 & 1 & 0 & 1 & 1 \\ 0 & 0 & 1 & 0 & 1 & 1 \end{pmatrix} = A_2 \quad (9)$$

Consequently, the reachable matrix of the matrix A can be obtained as the matrix that is represented with formula (9). Note that, in formula (7), $A_0$ represents the unit matrix. It is thereby possible to detect the processes 33 having a direct or indirect relation with the addition target process 33 based on the obtained reachable matrix.

Accordingly, as shown in FIG. 20, by updating the reachable relation column 50A of the inter-node reachable relation table 50 based on the obtained reachable matrix, and additionally changing the update flags, which correspond to the elements which were changed to "1" among the respective elements of the reachable relation column 50A, to "Add" among the respective update flags of the update flag column 50B, the inter-node reachable relation table 50 can be updated according the processing result of the inter-node direct relation addition processing explained above with reference to FIG. 18.

Figure 21:
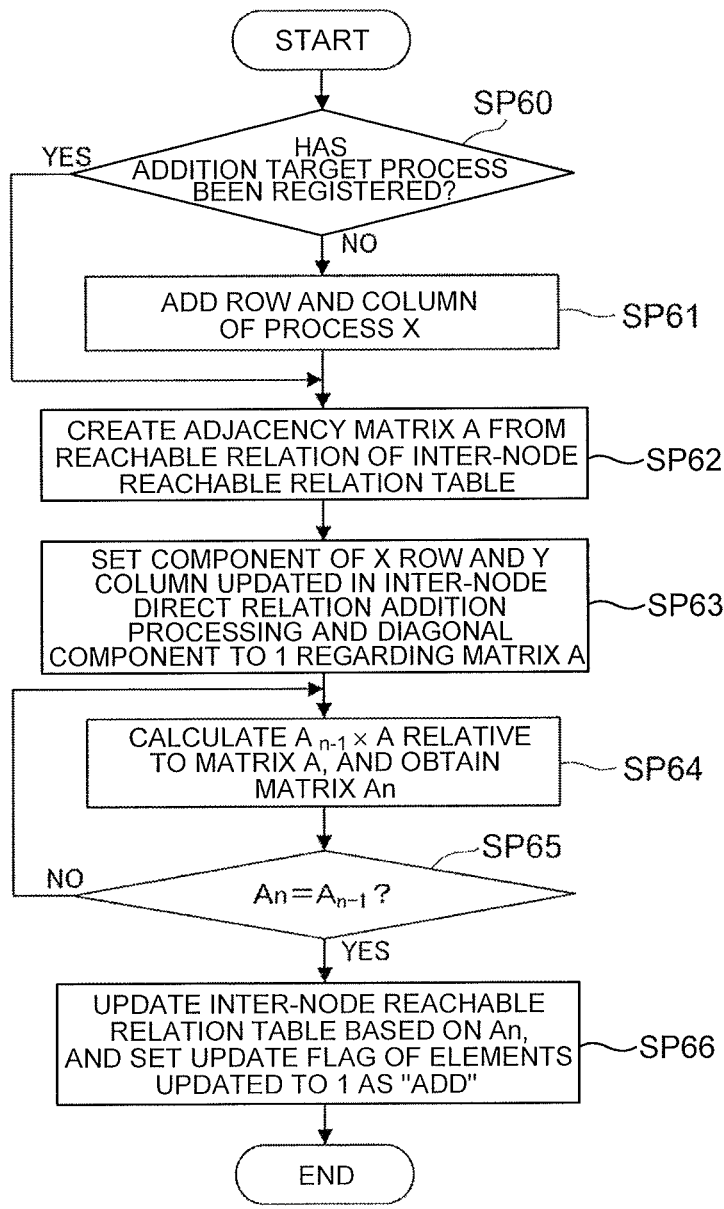
FIG. 21 is a flowchart showing the processing routine of the inter-node reachable relation addition processing.

FIG. 21 shows the processing routine of the inter-node reachable relation addition processing that is executed by the inter-node relation extraction unit 55 in step SP42 of the configuration comprehension processing (FIG. 17) in accordance with the foregoing principle.

When the inter-node relation extraction unit 55 proceeds to step SP42 of the configuration comprehension processing, the inter-node relation extraction unit 55 starts the inter-node reachable relation addition processing shown in FIG. 21, and foremost determines whether the relevant addition target process 33 has been registered in the inter-node reachable relation table 50 (SP60).

Next, the inter-node relation extraction unit 55 adds the row and column of the addition target process 33 to the reachable relation column 50A of the inter-node reachable relation table 50 and sets all flags stored in the respective columns 50AA in the added row and column to "0", as well as adds the row and column of the addition target process 33 to the update flag column 50B and sets all update flags stored in the respective column 50BA in the added row and column to "No change" (SP61).

Subsequently, the inter-node relation extraction unit 55 creates an adjacency matrix A from the reachable relation column 50A of the inter-node reachable relation table 50 (SP62), and updates the respective elements of X row, Y column and Y row, X column, and the diagonal elements, in the created adjacency matrix A to "1" (SP63).

In addition, the inter-node relation extraction unit 55 calculates $A_{n-1} \times A$ relative to the matrix A (SP64). Note that, initially, n is set to "1". Subsequently, the inter-node relation extraction unit 55 determines whether the matrix $A_n$ obtained from the operation in step SP64 and the original matrix $A_{n-1}$ are a match (SP65).

When the inter-node relation extraction unit 55 obtains a negative result in this determination, the inter-node relation extraction unit 55 increases the value of n by "1", thereafter returns to step SP64, and then repeats the loop of step SP64 to step SP65 to step SP64.

When the inter-node relation extraction unit 55 obtains a positive result in step SP65 as a result of eventually calculating the reachable matrix $A_n$ of the matrix A, the inter-node relation extraction unit 55 updates the flags stored in the corresponding columns 50AA in the reachable relation column 50A to "1" with regard to elements in which the value of the flags stored in the corresponding column 50AA is "0" and the elements in which the value of the corresponding elements of the reachable matrix $A_n$ is "1" in the reachable relation column 50A of the inter-node reachable relation table 50. Moreover, among the update flags stored in the respective columns 50BA of the update flag column 50B of the inter-node reachable relation table 50, the inter-node relation extraction unit 55 updates the respective update flags corresponding to the respective columns 50AA, in which the flag of the reachable relation column 50A was updated to "1" as described above, to "Add" (SP66).

The inter-node relation extraction unit 55 thereafter ends the inter-node reachable relation addition processing and returns to the configuration comprehension processing.

(3-2-3-4) Inter-Node Direct Relation Deletion Processing

Figures 22, 23:
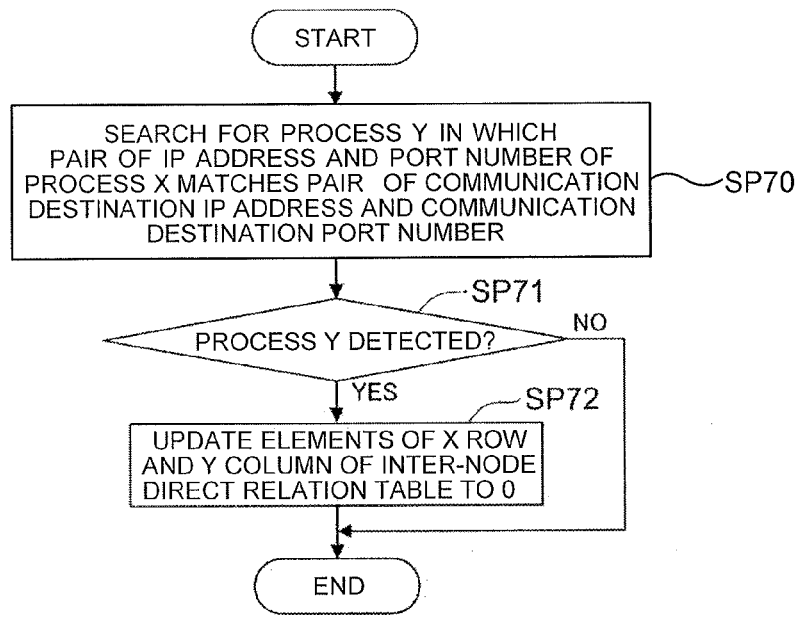
FIG. 22 is a flowchart showing the processing routine of the inter-node direct relation deletion processing.
FIG. 23 is a conceptual diagram explaining the inter-node reachable relation deletion processing.

Meanwhile, FIG. 22 shows the processing routine of the inter-node direct relation deletion processing that is executed by the inter-node relation extraction unit 55 in step SP45 of the configuration comprehension processing (FIG. 17) described above.

When the inter-node relation extraction unit 55 proceeds to step SP45 of the configuration comprehension processing, the inter-node relation extraction unit 55 starts the inter-node direct relation deletion processing shown in FIG. 22, and foremost searches, from the node operation information table 46, for processes 33 that are communicating with the relevant deletion target process 33 via the network 5 (SP70). Specifically, the inter-node relation extraction unit 55 searches for processes 33 in which the pair of the IP address and the port number of the relevant deletion target process 33 matches the pair of the IP address stored in the communication destination IP address column 46E (FIG. 6) and the port number stored in the communication destination port number column 46F (FIG. 6) among the processes 33 registered in the node operation information table 46.

Thereafter, the inter-node relation extraction unit 55 determines whether it was possible to detect a corresponding process 33 as a result of the search performed in step SP70 (SP71). When the inter-node relation extraction unit 55 obtains a negative result in this determination, the inter-node relation extraction unit 55 ends the inter-node relation deletion processing and returns to the configuration comprehension processing.

Meanwhile, when the inter-node relation extraction unit 55 obtains a positive result in the determination of step SP71, with regard to all processes 33 that were detected in the search performed in step SP70, the inter-node relation extraction unit 55 updates the flag (flag of X row, Y column) located at the intersection of the column (Y column) corresponding to that process 33 and the row (X row) corresponding to the relevant addition target process 33 to "0" among the respective flags stored in the respective columns 49A of the inter-node direct relation table 49 (SP54).

The inter-node relation extraction unit 55 thereafter ends the inter-node direct relation addition processing and returns to the configuration comprehension processing.

(3-2-3-5) Inter-Node Reachable Relation Deletion Processing

The inter-node reachable relation deletion processing that is executed by the inter-node relation extraction unit 55 in step SP46 of the configuration comprehension processing (FIG. 17) is now explained. Prior to this explanation, the method of detecting the processes 33 having a direct or an indirect relation with the deletion target process 33 is foremost explained.

In this embodiment, by converting the inter-node direct relation table 49 that was updated in the foregoing inter-node direct relation deletion processing into an adjacency matrix, and obtaining a reachable matrix of that adjacency matrix, processes 33 having a direct or an indirect relation with the deletion target process 33 are detected, and the inter-node reachable relation table 50 is updated based on the detection result.

In the foregoing case, since the deletion of a process 33 will only have an influence within the group of processes 33 having a direct or an indirect relation with the deletion target process 33, computational efforts are reduced by limiting the calculation to be within the influenced group, and re-calculating the reachable matrix from the incidence matrix which reflects the deletion target process 33.

For example, as shown in FIG. 23, foremost, a set Z of processes in which the row of the deletion target process 33 is "1" is created from the inter-node reachable relation table 50. Note that FIG. 23 shows a case where a process 33 having a process ID of "3" is the deletion target process 33. Accordingly, in the foregoing case, the set Z will be the set of the respective processes 33 having a process ID of "1", "3" and "5" as represented with the following formula:

[Math 10]

$$Z = \{1,3,5\} \quad (10)$$

Next, as shown in FIG. 24, an adjacency matrix B is created only with the processes 33 belonging to the set Z of the inter-node direct relation table 49. Specifically, only the rows and columns of the processes 33 having a process ID of "1", "3" and "5" are extracted from the inter-node direct relation table 49 in order to create the adjacency matrix B. Accordingly, in the example illustrated in FIG. 24, the adjacency matrix B will be represented with the following formula:

[Math 11]

$$B = \begin{pmatrix} 0 & 1 & 0 \\ 1 & 0 & 0 \\ 0 & 0 & 0 \end{pmatrix} \quad (11)$$

Note that, in the case of deleting a process 33, the inter-node direct relation table 49, and not the inter-node reachable relation table 50, is used. This is because the reachable relation is re-calculated and updated only for influential direct relations, rather than deleting the calculated reachable relation.

Subsequently, in order to cause the matrix B to be a matrix of the addition result after adding the unit matrix, all diagonal components of the matrix B of formula (11) are updated to "1" as represented with the following formula:

[Math 12]

$$B = \begin{pmatrix} 0 & 1 & 0 \\ 1 & 0 & 0 \\ 0 & 0 & 1 \end{pmatrix} \quad (12)$$

Furthermore, a matrix $A_n$ is sequentially obtained by calculating $A_{n-1} \times B$ relative to the matrix B, and the reachable matrix of the matrix B is obtained based on the foregoing result. For example, the value of the matrix $A_1$ is represented with the following formula:

[Math 13]

$$A_1 = A_0 \times B = \begin{pmatrix} 1 & 1 & 0 \\ 1 & 1 & 0 \\ 0 & 0 & 1 \end{pmatrix} \quad (13)$$

Meanwhile, the value of the matrix $A_2$ is represented with the following formula:

[Math 14]

$$A_2 = A_1 \times B = \begin{pmatrix} 1 & 1 & 0 \\ 1 & 1 & 0 \\ 0 & 0 & 1 \end{pmatrix} = A_1 \quad (14)$$

Consequently, the reachable matrix of the matrix B can be obtained as the matrix that is represented with formula (13). It is thereby possible to detect the processes 33 having a direct or indirect relation with the addition target process 33 based on the obtained reachable matrix.

Accordingly, as shown in FIG. 25, by updating the reachable relation column 50A of the inter-node reachable relation table 50 based on the obtained reachable matrix, and additionally changing the update flags, which correspond to the elements which were changed to "1" among the respective elements of the reachable relation column 50A, to "Add" among the respective update flags of the update flag column 50B, the inter-node reachable relation table 50 can be updated according the processing result of the inter-node direct relation deletion processing explained above with reference to FIG. 22.

Figure 26:
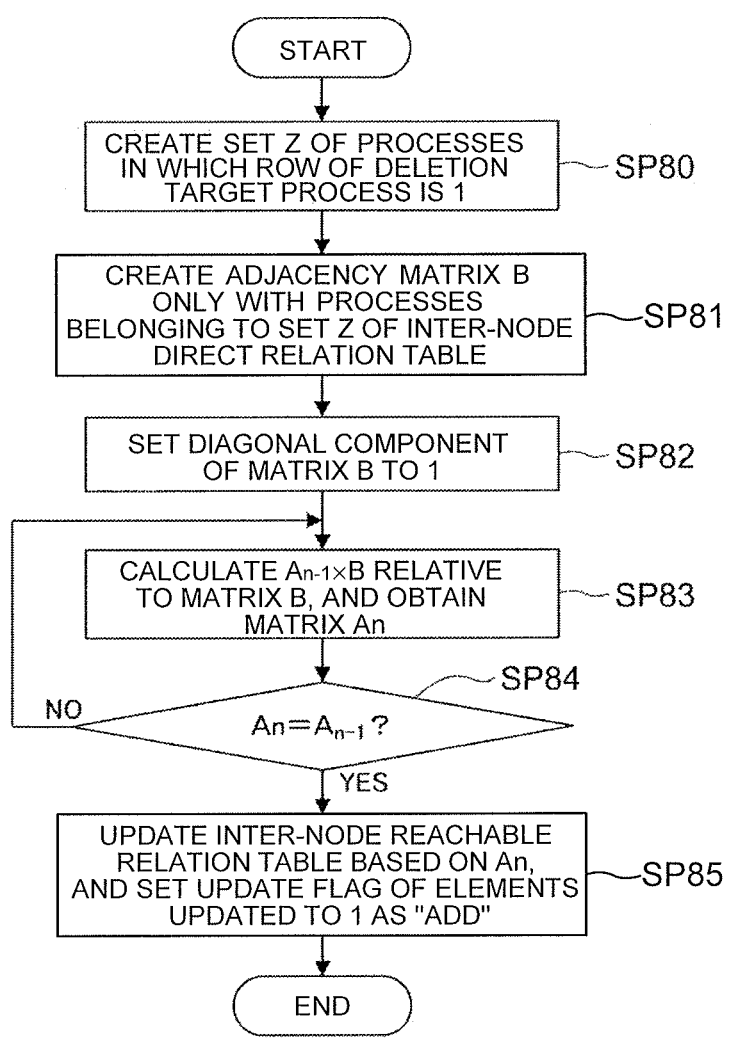
FIG. 26 is a flowchart showing the processing routine of the inter-node reachable relation deletion processing.

FIG. 26 shows the processing routine of the inter-node reachable relation deletion processing that is executed by the inter-node relation extraction unit 55 in step SP46 of the configuration comprehension processing (FIG. 17) in accordance with the foregoing principle.

When the inter-node relation extraction unit 55 proceeds to step SP46 of the configuration comprehension processing, the inter-node relation extraction unit 55 starts the inter-node reachable relation deletion processing shown in FIG. 26, and foremost creates a set Z of processes 33 in which the value of the row of the deletion target process 33 is "1" from the inter-node reachable relation table 50 (SP80).

Next, the inter-node relation extraction unit 55 creates an adjacency matrix B only with the processes 33 belonging to the set Z of the inter-node direct relation table 49 (SP81), and thereafter changes all diagonal elements of the created adjacency matrix B to "1" (SP82).

Subsequently, the inter-node relation extraction unit 55 calculates $A_{n-1} \times B$ relative to the adjacency matrix B (SP83). Note that, initially, n is set to "1". Subsequently, the inter-node relation extraction unit 55 determines whether the matrix $A_n$ obtained from the operation in step SP83 and the original matrix $A_{n-1}$ are a match (SP84).

When the inter-node relation extraction unit 55 obtains a negative result in this determination, the inter-node relation extraction unit 55 increases the value of n by "1", thereafter returns to step SP83, and then repeats the loop of step SP83 to step SP84 to step SP83.

When the inter-node relation extraction unit 55 obtains a positive result in step SP84 as a result of eventually calculating the reachable matrix $A_n$ of the adjacency matrix B, the inter-node relation extraction unit 55 updates to "0" the value of the flags in the reachable relation column 50A of the inter-node reachable relation table 50 having a value of "1" and the respective flags in which the value of the corresponding elements of the reachable matrix $A_n$ is "0". Moreover, among the respective update flags in the update flag column 50B of the inter-node reachable relation table 50, the inter-node relation extraction unit 55 updates the respective update flags, which correspond to the respective flags of the reachable relation column 50A which were update to "0", to "Delete" (SP85).

The inter-node relation extraction unit 55 thereafter ends the inter-node reachable relation deletion processing and returns to the configuration comprehension processing.

Figure 27:
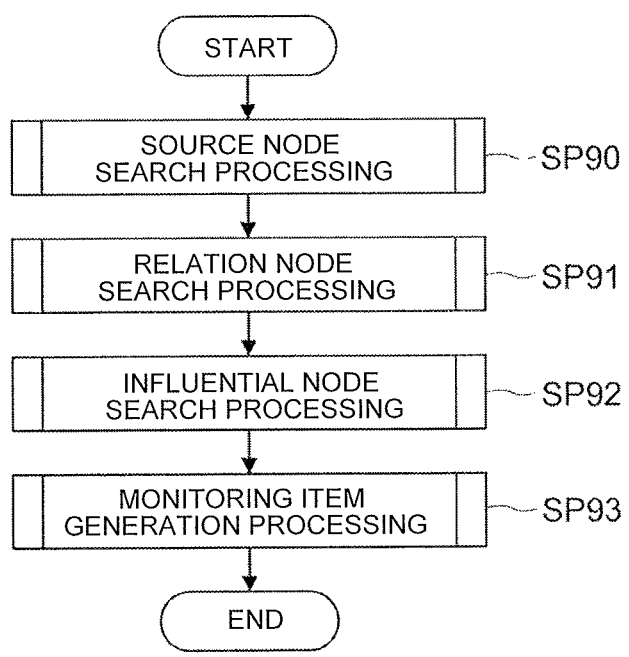
FIG. 27 is a flowchart showing the processing routine of the monitoring item selection processing.

(3-2-4) Processing of Monitoring Item Selection Unit (3-2-4-1) Monitoring Item Selection Processing FIG. 27 shows the flow of the monitoring item selection processing that is executed by the monitoring item selection unit 43 in step SP24 of the monitoring item selection overall processing (FIG. 15) described above. The monitoring item selection unit 43 selects the monitoring items according to the flow of FIG. 27.

In effect, the monitoring item selection processing is started in the monitoring item selection unit 43 when the inter-node direct relation table 49 or the inter-node reachable relation table 50 is updated, and, foremost, the source node searching unit 56 refers to the node operation information table 46 and the source node condition table 44 to search for a process 33 to become the source node, and updates the selected source node table 52A (FIG. 10(A)) based on the search result (SP90).

Next, the relation node searching unit 57 refers to the updated selected source node table 52A and inter-node reachable relation table 50, searches for a relation node of the process 33 to become the source node that was detected in the search performed in step SP90, and updates the selected relation node table 52B (FIG. 10(B)) based on the search result (SP91).

Subsequently, the influential node searching unit 58 refers to the updated selected relation node table 52B and resource access information table 47, searches for an influential node of the source node detected in the search performed in step SP90 and the relation node detected in the search performed in step SP91, and updates the selected influential node table 52C (FIG. 10(C)) based on the search result (SP92).

Furthermore, the monitoring item generation unit 59 selects the monitoring items to be monitored based on the processing results of step SP90 to step SP92 described above, and updates the monitoring item table 54 based on the selection result (SP93).

When the monitoring item selection unit 43 completes the processing up to step SP93, the monitoring item selection unit 43 ends the monitoring item selection processing.

(3-2-4-2) Source Node Search Processing

Figure 28:
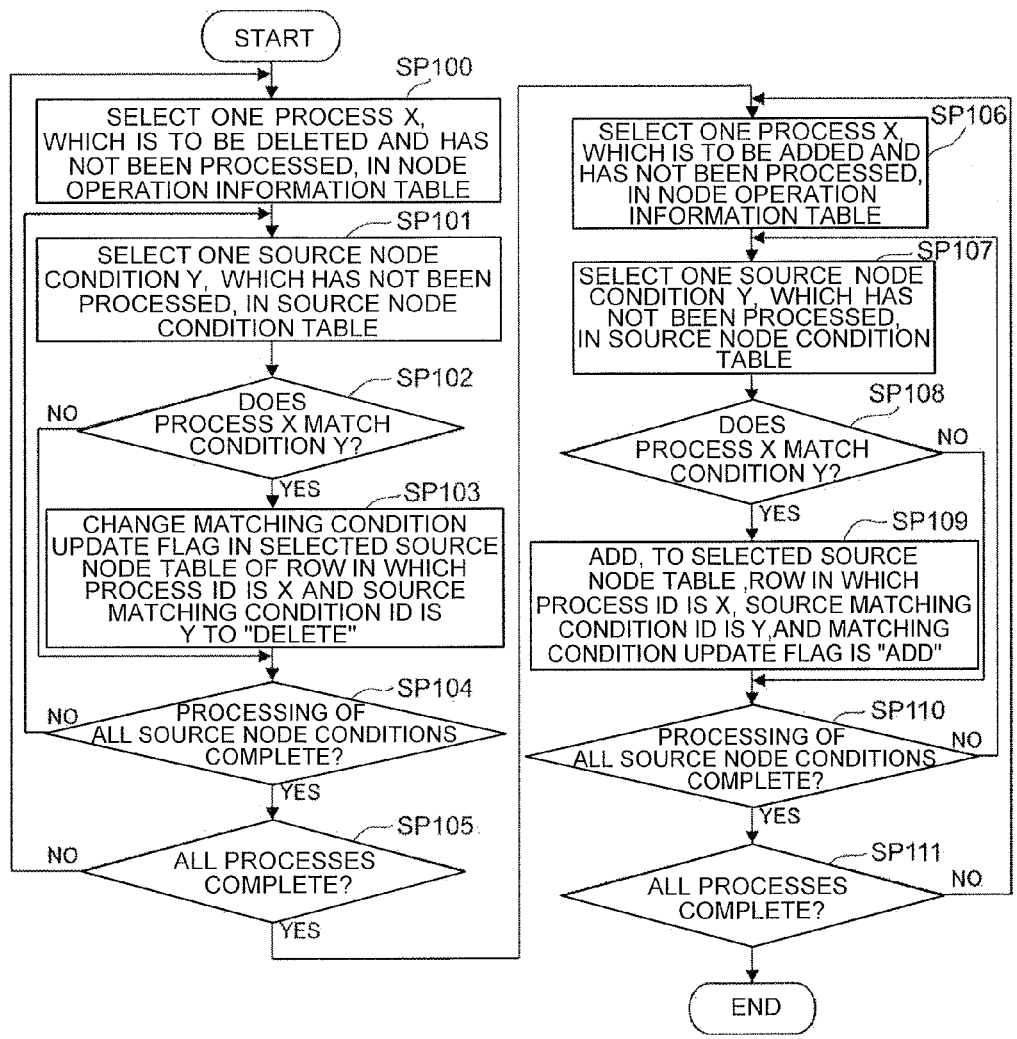
FIG. 28 is a flowchart showing the processing routine of the source node search processing.

FIG. 28 shows the processing routine of the source node search processing that is executed by the source node searching unit 56 in step SP90 of the monitoring item selection processing (FIG. 27) described above.

When the source node searching unit 56 proceeds to step SP90 of the monitoring item selection processing, the source node searching unit 56 starts the source node search processing shown in FIG. 28, and foremost executes the processing of SP100 to SP105 in order to update the update flags of the processes 33, among the processes 33 that are registered as a source node in the selected source node table 52A, which are no longer to be used as a source node due to the configuration change of the monitoring target device 2, to "Delete".

In effect, the source node searching unit 56 selects one unprocessed process 33 among the processes 33 registered in the node operation information table 46 in which the update flag is set to "Delete" (SP100).

Next, the source node searching unit 56 selects one unprocessed source node condition among the respective source node conditions registered in the source node condition table 44 (FIG. 5) (SP101), and thereafter determines whether the process 33 selected in step SP100 satisfies the source node condition selected in step SP101 (SP102).

When the source node searching unit 56 obtains a negative result in this determination, the source node searching unit 56 proceeds to step SP104. Meanwhile, when the source node searching unit 56 obtains a positive result, the source node searching unit 56 updates the selected source node table 52A (SP103). Specifically, the source node searching unit 56 changes, to "Delete", the matching condition update flags stored in the matching condition update flag column 52AC of the entries, among the entries of the selected source node table 52A, in which the process ID stored in the process ID column 52AA matches the process ID of the process 33 selected in step SP100, and in which the matching condition ID stored in the matching condition ID column 52AB matches the condition node ID of the source node condition selected in step SP101.

Thereafter, the source node searching unit 56 determines whether the execution of processing of step SP101 to step SP103 has been completed regarding all source node conditions registered in the source node condition table 44 (SP104).

When the source node searching unit 56 obtains a negative result in this determination, the source node searching unit 56 returns to step SP101, and thereafter repeats the processing of step SP101 to step SP104.

When the source node searching unit 56 obtains a positive result in step SP104 as a result of eventually completing the execution of processing of step SP101 to step SP103 regarding all source node conditions registered in the source node condition table 44, the source node searching unit 56 determines whether the execution of processing of step SP100 to step SP104 has been completed regarding all corresponding processes 33 registered in the node operation information table 46 (SP105).

When the source node searching unit 56 obtains a negative result in this determination, the source node searching unit 56 returns to step SP100, and thereafter repeats the processing of step SP100 to step SP105.

When the source node searching unit 56 obtains a positive result in step SP105 as a result of eventually completing the execution of processing of step SP100 to step SP104 regarding all corresponding processes 33 registered in the node operation information table 46, the source node searching unit 56 thereafter executes the processing of SP106 to SP111 so as to register, in the selected source node table 52A, the processes 33 to become a new source node due to the configuration change of the monitoring target device 2, and set the update flags thereof to "Add".

In effect, the source node searching unit 56 foremost selects one unprocessed process 33 among the processes 33 registered in the node operation information table 46 in which the update flag is set to "Add" (SP106).

Next, the source node searching unit 56 selects one unprocessed source node condition among the respective source node conditions registered in the source node condition table 44 (SP107), and thereafter determines whether the process 33 selected in step SP106 satisfies the source node condition selected in step SP107 (SP108).

When the source node searching unit 56 obtains a negative result in this determination, the source node searching unit 56 proceeds to step SP110. Meanwhile, when the source node searching unit 56 obtains a positive result, the source node searching unit 56 updates the selected source node table 52A (SP109). Specifically, the source node searching unit 56 changes, to "Add", the matching condition update flags stored in the matching condition update flag column 52AC of the entries, among the entries of the selected source node table 52A, in which the process ID stored in the process ID column 52AA matches the process ID of the process 33 selected in step SP106, and in which the matching condition ID stored in the matching condition ID column 52AB matches the condition node ID of the source node condition selected in step SP107.

Thereafter, the source node searching unit 56 determines whether the execution of processing of step SP107 to step SP109 has been completed regarding all source node conditions registered in the source node condition table 44 (SP110). When the source node searching unit 56 obtains a negative result in this determination, the source node searching unit 56 returns to step SP107, and thereafter repeats the processing of step SP107 to step SP110.

When the source node searching unit 56 obtains a positive result in step SP110 as a result of eventually completing the execution of processing of step SP107 to step SP109 regarding all source node conditions registered in the source node condition table 44, the source node searching unit 56 determines whether the execution of processing of step SP106 to step SP110 has been completed regarding all corresponding processes 33 registered in the node operation information table 46 (SP111).

When the source node searching unit 56 obtains a negative result in this determination, the source node searching unit 56 returns to step SP106, and thereafter repeats the processing of step SP106 to step SP111.

When the source node searching unit 56 obtains a positive result in step SP110 as a result of eventually completing the execution of processing of step SP106 to step SP110 regarding all corresponding processes 33 registered in the node operation information table 46, the source node searching unit 56 ends the source node search processing.

(3-2-4-3) Relation Node Search Processing

Figure 29:
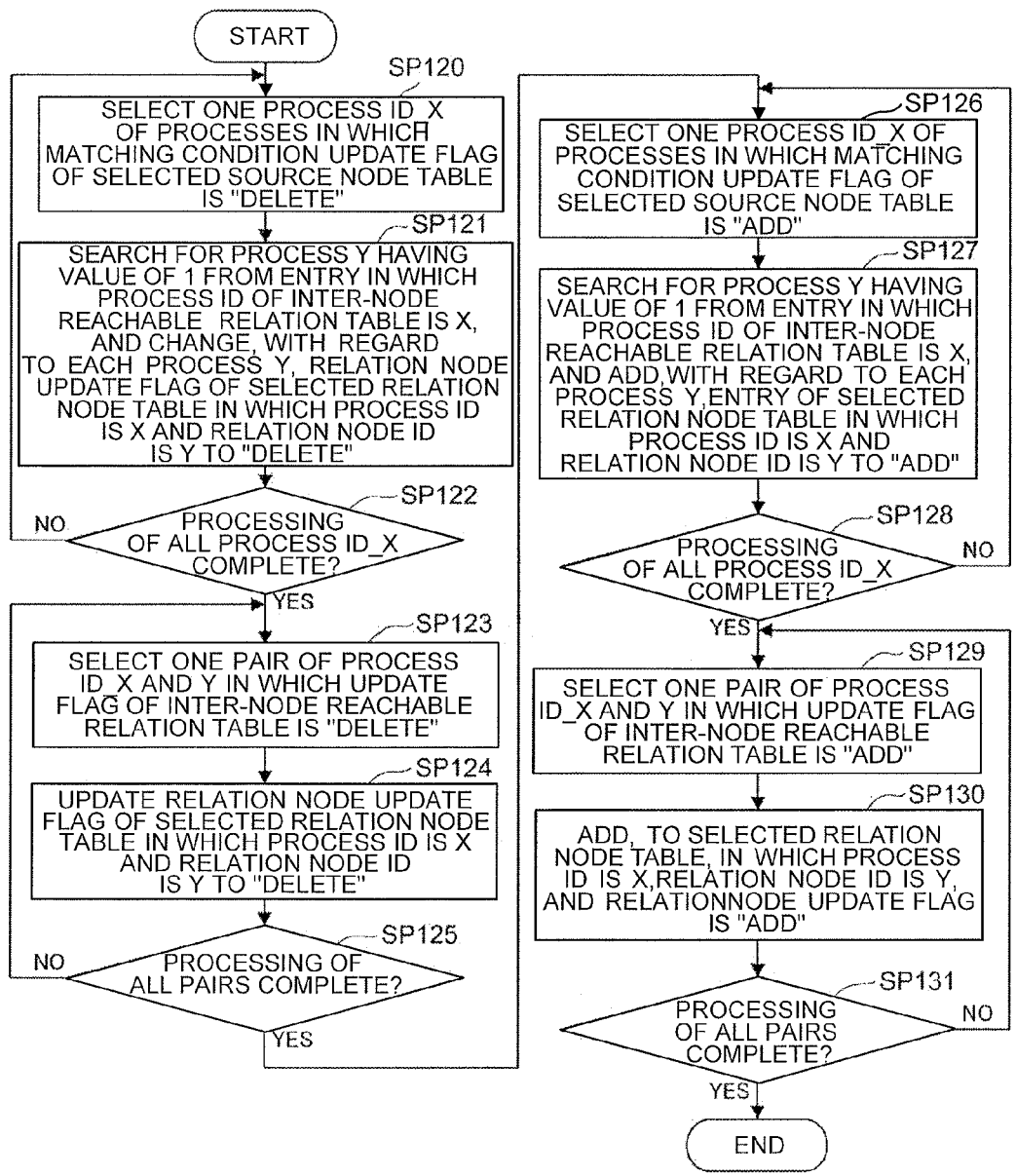
FIG. 29 is a flowchart showing the processing routine of the relation node search processing.

Meanwhile, FIG. 29 shows the processing routine of the relation node search processing that is executed by the relation node searching unit 57 in step SP91 of the monitoring item selection processing described above.

When the relation node searching unit 57 proceeds to step SP91 of the monitoring item selection processing, the relation node searching unit 57 starts the relation node search processing shown in FIG. 29, and foremost executes the processing of step SP120 to step SP126 in order to update the relation node update flags in the selected relation node table 52B of the processes 33 which are no longer to be used as the relation node, among the processes 33 in which the matching condition update flag in the selected source node table 52A or the update flag in the inter-node reachable relation table 50 was updated to "Delete", to "Delete".

In effect, the relation node searching unit 57 selects one unprocessed process 33 among the processes 33 registered in the selected source node table 52A in which the matching condition update flag is set to "Delete" (SP120).

Next, the relation node searching unit 57 detects processes 33 in which the flag in the entry (row) corresponding to the process 33 selected in step SP120 is "1" in the reachable relation column 50A of the inter-node reachable relation table 50 (FIG. 9). Subsequently, the relation node searching unit 57 updates the relation node update flag of the processes 33, among the detected processes 33, in which the process ID of the selected relation node table 52B matches the process ID of the process 33 selected in step SP120 and in which the relation node ID matches the process ID of the process 33 in which the flag detected in the inter-node reachable relation table 50 is set to "1" as described above, to "Delete" (SP121).

Subsequently, the relation node searching unit 57 determines whether the execution of processing of step SP120 and step SP121 has been completed regarding all processes 33 in which the matching condition update flag in the selected source node table 52A is set to "Delete" (SP122).

When the relation node searching unit 57 obtains a negative result in this determination, the relation node searching unit 57 returns to step SP120, and thereafter repeats the processing of step SP120 to step SP122.

When the relation node searching unit 57 obtains a positive result in step SP122 as a result of eventually completing the execution of processing of step SP120 and step SP121 regarding all processes 33 in which the matching condition update flag in the selected source node table 52A is set to "Delete", the relation node searching unit 57 selects one unprocessed pair among the pairs of processes 33 in which the update flag in the update flag column 50B of the inter-node reachable relation table 50 is set to "Delete" (one process is hereinafter referred to as the "first process 33" and the other process is hereinafter referred to as the "second process 33" as appropriate) (SP123).

Moreover, the relation node searching unit 57 updates, to "Delete", the relation node update flag of the processes 33, among the processes 33 registered in the selected relation node table 52B, in which the process ID of the first process 33 of the pair selected in step SP123 matches the process ID, and in which the process ID of the second process 33 of the pair selected in step SP123 matches the relation node ID (SP124).

Thereafter, the relation node searching unit 57 determines whether the execution of processing of step SP123 and step SP124 has been completed regarding all pairs of processes 33 in which the update flag in the update flag column 50B of the inter-node reachable relation table 50 is set to "Delete" (SP125).

When the relation node searching unit 57 obtains a negative result in this determination, the relation node searching unit 57 returns to step SP123, and thereafter repeats the processing of step SP123 to step SP125.

When the relation node searching unit 57 obtains a positive result in step SP125 as a result of eventually completing the execution of processing of step SP123 and step SP124 regarding all pairs of processes 33 in which the update flag in the update flag column 50B of the inter-node reachable relation table 50 is set to "Delete", the relation node searching unit 57 thereafter executes the processing of step SP126 to step SP131 so as to register, in the selected relation node table 52B, the processes 33 in which the matching condition update flag in the selected source node table 52A or the update flag in the inter-node reachable relation table 50 is set to "Add", and set the relation node update flag thereof to "Add".

In effect, the relation node searching unit 57 selects one unprocessed process 33 among the processes 33 registered in the selected source node table 52A in which the matching condition update flag is set to "Add" (SP126).

Next, the relation node searching unit 57 detects processes 33 in which the flag in the entry (row) corresponding to the process 33 selected in step SP120 is "1" in the reachable relation column 50A of the inter-node reachable relation table 50 (FIG. 9), and adds, to the selected relation node table 52B, the entries corresponding to each of the detected processes 33 (SP127). Specifically, the relation node searching unit 57 adds, to the selected relation node table 52B, the entries of the processes 33 detected as described above in which the process ID is stored in the relation node ID column 52BB, the process ID of the processes 33 selected in step SP126 is stored in the process ID column 52BA, and "Add" is stored in the relation node update flag column 52BC.

Subsequently, the relation node searching unit 57 determines whether the execution of processing of step SP126 and step SP127 has been completed regarding all processes 33 in which the matching condition update flag in the selected source node table 52A is set to "Add" (SP128).

When the relation node searching unit 57 obtains a negative result in this determination, the relation node searching unit 57 returns to step SP126, and thereafter repeats the processing of step SP126 to step SP128.

When the relation node searching unit 57 obtains a positive result in step SP128 as a result of eventually completing the execution of processing of step SP126 and step SP127 regarding all processes 33 in which the matching condition update flag in the selected source node table 52A is set to "Delete", the relation node searching unit 57 selects one unprocessed pair among the pairs of processes 33 in which the update flag in the update flag column 50B of the inter-node reachable relation table 50 is set to "Add" (one process is hereinafter referred to as the "third process 33" and the other process is hereinafter referred to as the "fourth process 33" as appropriate) (SP129).

Moreover, the relation node searching unit 57 adds, to the selected relation node table 52B, the entries corresponding to the pair selected in step SP129 (SP130). Specifically, the relation node searching unit 57 adds, to the selected relation node table 52B, the entries in which the process ID of the third process is stored in the process ID column 52BA, the process ID of the fourth process is stored in the relation node ID column 52BB, and the relation node update flag stored in the relation node update flag column 52BC is set to "Add".

Thereafter, the relation node searching unit 57 determines whether the execution of processing of step SP129 and step SP130 has been completed regarding all pairs of processes in which the update flag in the update flag column 50B of the inter-node reachable relation table 50 is set to "Add" (SP131).

When the relation node searching unit 57 obtains a negative result in this determination, the relation node searching unit 57 returns to step SP129, and thereafter repeats the processing of step SP129 to step SP131.

When the relation node searching unit 57 obtains a positive result in step SP131 as a result of eventually completing the execution of processing of step SP129 and step SP130 regarding all pairs of processes in which the update flag in the update flag column 50B of the inter-node reachable relation table 50 is set to "Add", the relation node searching unit 57 ends the relation node search processing.

(3-2-4-4) Influential Node Search Processing

Figure 30A:
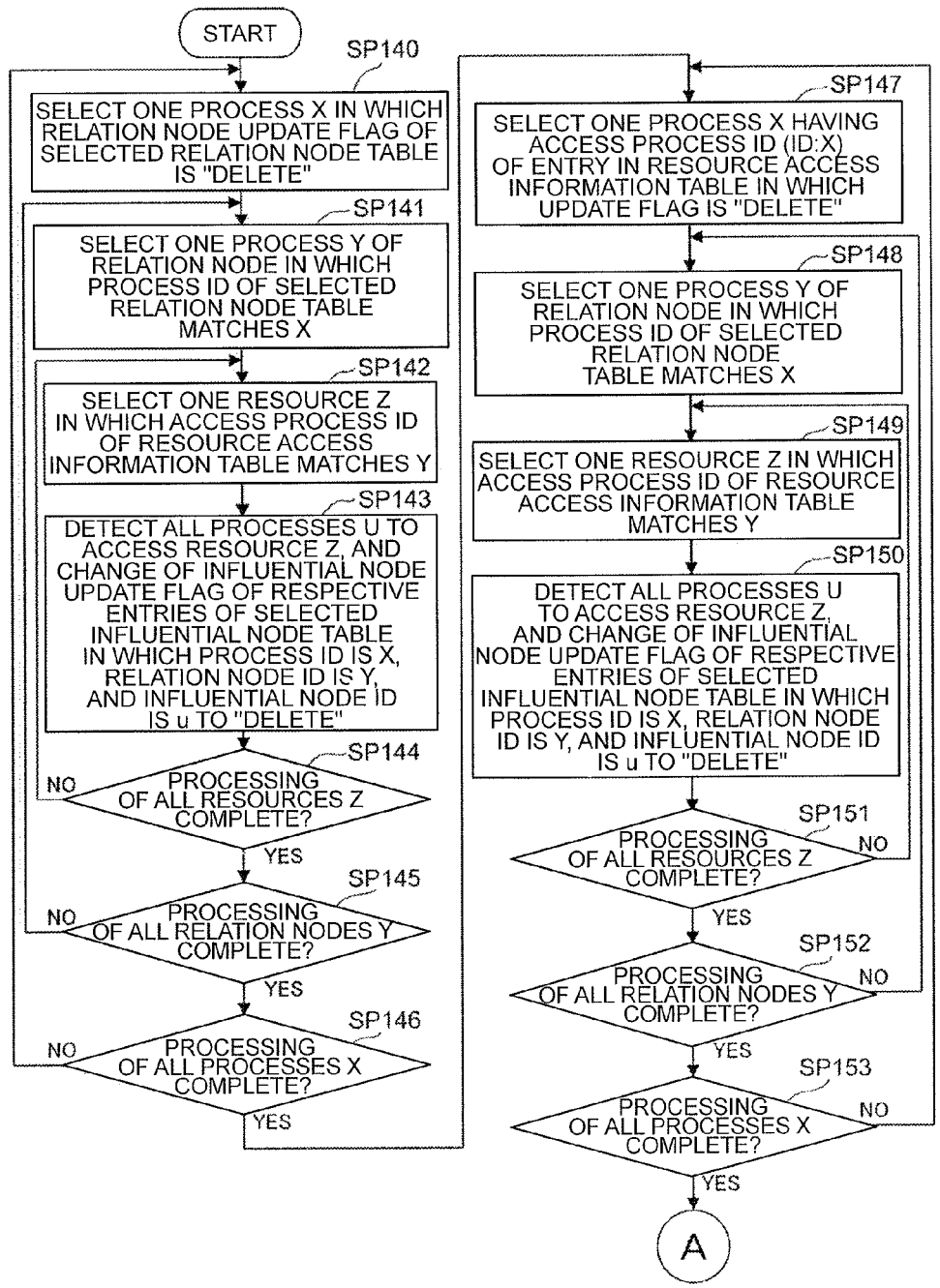
FIG. 30A is a flowchart showing the processing routine of the influential node search processing.
Figure 30B:
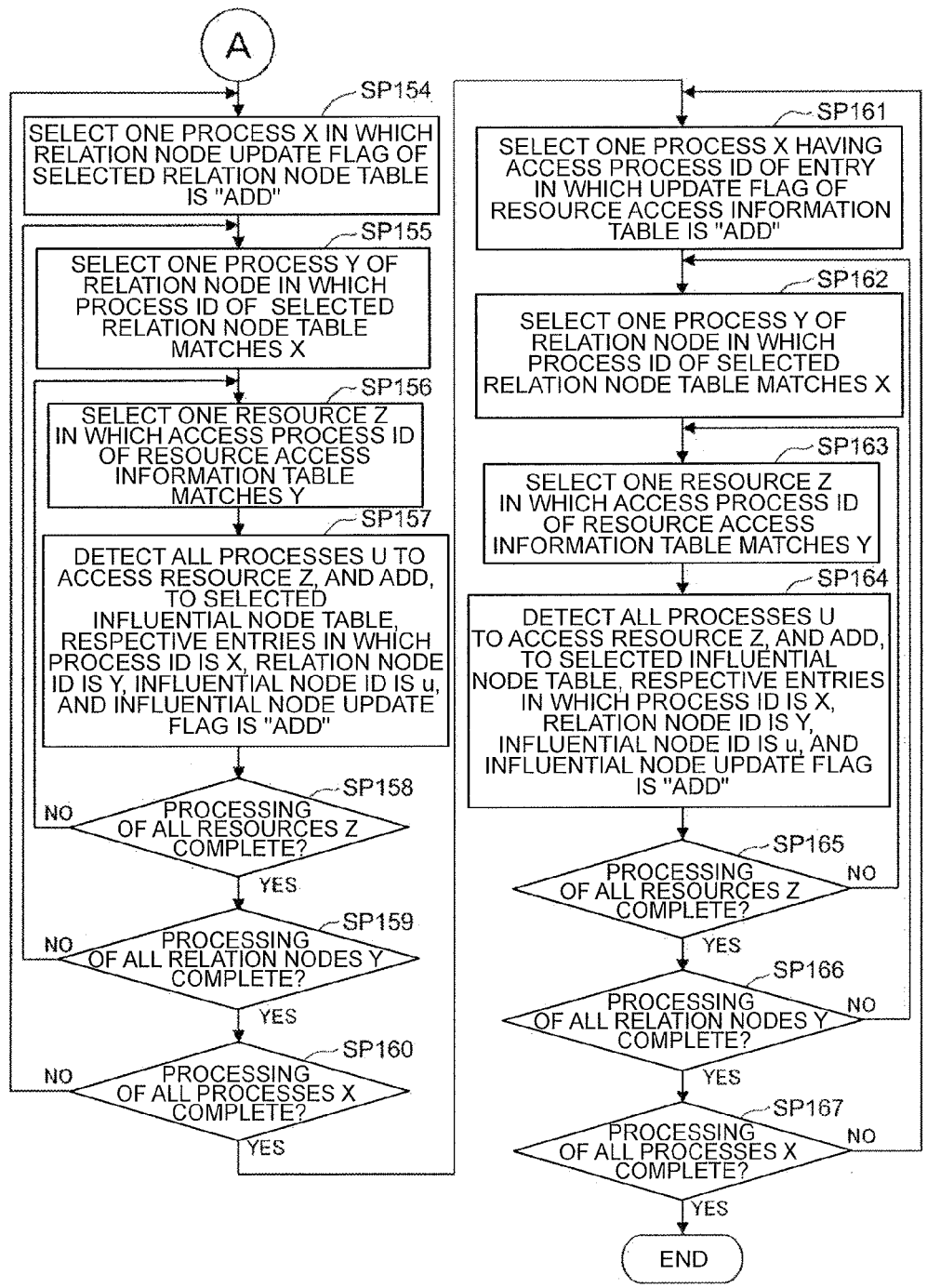
FIG. 30B is a flowchart showing the processing routine of the influential node search processing.

Meanwhile, FIG. 30A and FIG. 30B show the processing routine of the influential node search processing that is executed by the influential node searching unit 58 in step SP92 of the monitoring item selection processing (FIG. 27) described above.

When the influential node searching unit 58 proceeds to step SP92 of the monitoring item selection processing, the influential node searching unit 58 starts the influential node search processing shown in FIG. 30A and FIG. 30B, and foremost executes the processing of step SP140 to step SP153 so as to change, to "Delete", the influential node update flag in the selected influential node table 52C of the processes 33 which are no longer to be used as the influential node.

In effect, the influential node searching unit 58 performs processing, in step SP140 to step SP146, to the processes 33 in which the relation node update flag in the selected relation node table 52B is set to "Delete".

In other words, the influential node searching unit 58 foremost selects one process ID of an unprocessed process 33 in which the relation node update flag is set to "Delete" among the processes 33 registered in the selected relation node table 52B (SP140).

Next, the influential node searching unit 58 selects one unprocessed process ID stored in the relation node ID column 52BB of any one of the entries, among the entries of the selected relation node table 52B, in which the process ID stored in the process ID column 52BA matches the process ID of the process 33 selected in step SP140 (SP141).

Subsequently, the influential node searching unit 58 selects one unprocessed resource in which the process ID stored in the access process ID column 47B of the resource access information table 47 (FIG. 7) matches the process ID selected in step SP141 (SP142).

Subsequently, the influential node searching unit 58 refers to the resource access information table 47, and searches for all processes 33 that access the resource selected in step SP142. In addition, the influential node searching unit 58 sets, to "Delete", the influential node update flag stored in the influential node update flag column 52CD of all entries, among the entries of the selected influential node table 52C, in which the process ID stored in the process ID column 52CA matches the process ID of the process 33 selected in step SP140, the process ID stored in the relation node ID column 52CB matches the process ID of the process 33 selected in step SP141, and the process ID stored in the influential node ID column 52CC matches the process ID of any one of the processes 33 that access the resource selected in step SP142 (SP143).

Thereafter, the influential node searching unit 58 determines whether the execution of processing of step SP142 and step SP143 has been completed regarding all resources in which the process ID selected in step SP141 is stored in the access process ID column 47B of the resource access information table 47 (SP144).

When the influential node searching unit 58 obtains a negative result in this determination, the influential node searching unit 58 returns to step SP142, and thereafter repeats the processing of step SP142 to step SP144.

When the influential node searching unit 58 obtains a positive result in step SP144 as a result of eventually completing the execution of the same processing regarding all resources in which the process ID selected in step SP141 is stored in the access process ID column 47B of the resource access information table 47, the influential node searching unit 58 determines whether the execution of processing of step SP141 to step SP144 has been completed regarding all process IDs stored in the relation node ID column 52CB of any one of the entries in which the process ID selected in step SP140 is stored in the process ID column 52CA of the selected relation node table 52B (SP145).

When the influential node searching unit 58 obtains a negative result in this determination, the influential node searching unit 58 returns to step SP141, and thereafter repeats the processing of step SP141 to step SP145.

When the influential node searching unit 58 obtains a positive result in step SP145 as a result of eventually completing the execution of processing of step SP141 to step SP144 regarding all process IDs stored in the relation node ID column 52BB of any one of the entries in which the process ID selected in step SP140 is stored in the process ID column 52CC of the selected relation node table 52B, the influential node searching unit 58 determines whether the execution of processing of step SP140 to step SP145 has been completed regarding the process ID of all processes in which the relation node update flag in the selected relation node table 52B is set to "Delete" (SP146).

When the influential node searching unit 58 obtains a negative result in this determination, the influential node searching unit 58 returns to step SP140, and thereafter repeats the processing of step SP140 to step SP146.

When the influential node searching unit 58 obtains a positive result in step SP146 as a result of eventually completing the execution of processing of step SP140 to step SP145 regarding the process ID of all processes in which the relation node update flag in the selected relation node table 52B is set to "Delete", the influential node searching unit 58 ends the processing performed to the respective processes 33 in which the relation node update flag in the selected relation node table 52B is set to "Delete".

Next, the influential node searching unit 58 performs processing, in step SP147 to step SP153, to the processes 33 that use the resource in which the update flag in the resource access information table 47 is set to "Delete".

In other words, the influential node searching unit 58 selects one unprocessed process among the processes 33 having the same process ID as the process ID stored in the access process ID column 47B of the entry in which the update flag in the resource access information table 47 is set to "Delete" (SP147).

Next, the influential node searching unit 58 selects one unprocessed process ID stored in the relation node ID column 52BB of any one of the entries, among the entries of the selected relation node table 52B, in which the process ID stored in the process ID column 52BA matches the process ID of the process 33 selected in step SP147 (SP148).

Subsequently, the influential node searching unit 58 selects one unprocessed resource in which the process ID stored in the access process ID column 47B of the resource access information table 47 matches the process ID of the process selected in step SP148 (SP149).

Subsequently, the influential node searching unit 58 refers to the resource access information table 47, and searches for all processes 33 that access the resource selected in step SP149. In addition, the influential node searching unit 58 sets, to "Delete", the influential node update flag stored in the influential node update flag column 52CD of all entries, among the entries of the selected influential node table 52C, in which the process ID stored in the process ID column 52CA matches the process ID of the process 33 selected in step SP147, the process ID stored in the relation node ID column 52CB matches the process ID of the process 33 selected in step SP148, and the process ID stored in the influential node ID column 52CC matches the process ID of any one of the processes 33 that access the resource selected in step SP149 (SP150).

Thereafter, the influential node searching unit 58 determines whether the execution of processing of step SP149 and step SP150 has been completed regarding all resources in which the process ID selected in step SP148 is stored in the access process ID column 47B of the resource access information table 47 (SP151).

When the influential node searching unit 58 obtains a negative result in this determination, the influential node searching unit 58 returns to step SP149, and thereafter repeats the processing of step SP149 to step SP150.

When the influential node searching unit 58 obtains a positive result in step SP151 as a result of eventually completing the execution of the same processing regarding all resources in which the process ID selected in step SP148 is stored in the access process ID column 47B of the resource access information table 47, the influential node searching unit 58 determines whether the execution of processing of step SP148 to step SP151 has been completed regarding all process IDs stored in the relation node ID column 52CB of any one of the entries in which the process ID selected in step SP147 is stored in the process ID column 52CA of the selected relation node table 52B (SP152).

When the influential node searching unit 58 obtains a negative result in this determination, the influential node searching unit 58 returns to step SP148, and thereafter repeats the processing of step SP148 to step SP152.

When the influential node searching unit 58 obtains a positive result in step SP152 as a result of eventually completing the execution of processing of step SP148 to step SP151 regarding all process IDs stored in the relation node ID column 52CB of any one of the entries in which the process ID selected in step SP147 is stored in the process ID column 52CA of the selected relation node table 52B, the influential node searching unit 58 determines whether the execution of processing of step SP147 to step SP152 has been completed regarding all processes 33 having the same process ID as the process ID stored in the access process ID column 47B of the respective entries in which the update flag of the resource access information table 47 is set to "Delete" (SP153).

When the influential node searching unit 58 obtains a negative result in this determination, the influential node searching unit 58 returns to step SP147, and thereafter repeats the processing of step SP147 to step SP153.

When the influential node searching unit 58 obtains a positive result in step SP153 as a result of eventually completing the execution of processing of step SP147 to step SP152 regarding all processes 33 having the same process ID as the process ID stored in the access process ID column 47B of the respective entries in which the update flag of the resource access information table 47 is set to "Delete", the influential node searching unit 58 ends the processing performed to the respective processes 33 that use the resource in which the update flag in the resource access information table 47 is set to "Delete".

Next, the influential node searching unit 58 executes the processing of step SP154 to step SP167 to newly register the required process 33 in the selected influential node table 52C.

In effect, the influential node searching unit 58 performs processing, in step SP154 to step SP160, to the process 33 in which the update flag in the selected relation node table 52B is set to "Add".

Note that, since the processing of step SP154 to step SP160 is the same as the processing of step SP140 to step SP146 excluding (A) and (B) below, the explanation thereof is omitted.

(A) The process ID selected in step SP154 is the process ID of an unprocessed process 33 in which the relation node update flag is set to "Add" among the processes registered in the selected relation node table 52B.

(B) In step SP157, all processes 33 that access the resource selected in step SP156 are searched by referring to the resource access information table 47. In addition, added to the selected influential node table 52C are entries in which the process ID of the process 33 selected in step SP154 is stored in the process ID column 52CA, the process ID of the process 33 selected in step SP155 is stored in the relation node ID column 52CB, the process ID of any one of the processes 33 that access the resource selected in step SP156 is stored in the influential node ID column 52CC, and the influential node update flag stored in the influential node update flag column 52CD is set to "Add". Moreover, the foregoing entries are added to the selected influential node table 52C regarding all processes 33 that access the resource selected in step SP156.

Subsequently, the influential node searching unit 58 performs, in step SP161 to step SP167, processing to the processes 33 that use the resource in which the update flag in the resource access information table 47 is set to "Add".

Note that, since the processing of step SP161 to step SP167 is the same as the processing of step SP147 to step SP153 excluding (A) and (B) below, the explanation thereof is omitted.

(A) The process 33 selected in step SP161 is the process having the same process ID as the process ID stored in the access process ID column 47B of the entries in which the update flag in the resource access information table 47 is set to "Add".

(B) In step SP164, all processes 33 that access the resource selected in step SP163 are searched by referring to the resource access information table 47. In addition, added to the selected influential node table 52C are entries in which the process ID of the process 33 selected in step SP161 is stored in the process ID column 52CA, the process ID of the process 33 selected in step SP162 is stored in the relation node ID column 52CB, the process ID of any one of the processes 33 that access the resource selected in step SP163 is stored in the influential node ID column 52CC, and the influential node update flag stored in the influential node update flag column 52CD is set to "Add". Moreover, the foregoing entries are added to the selected influential node table 52C regarding all processes 33 that access the resource selected in step SP163.

When the influential node searching unit 58 completes the processing up to step SP167, the influential node searching unit 58 ends the influential node search processing.

(3-24-5) Monitoring Item Generation Processing

Figure 31A:
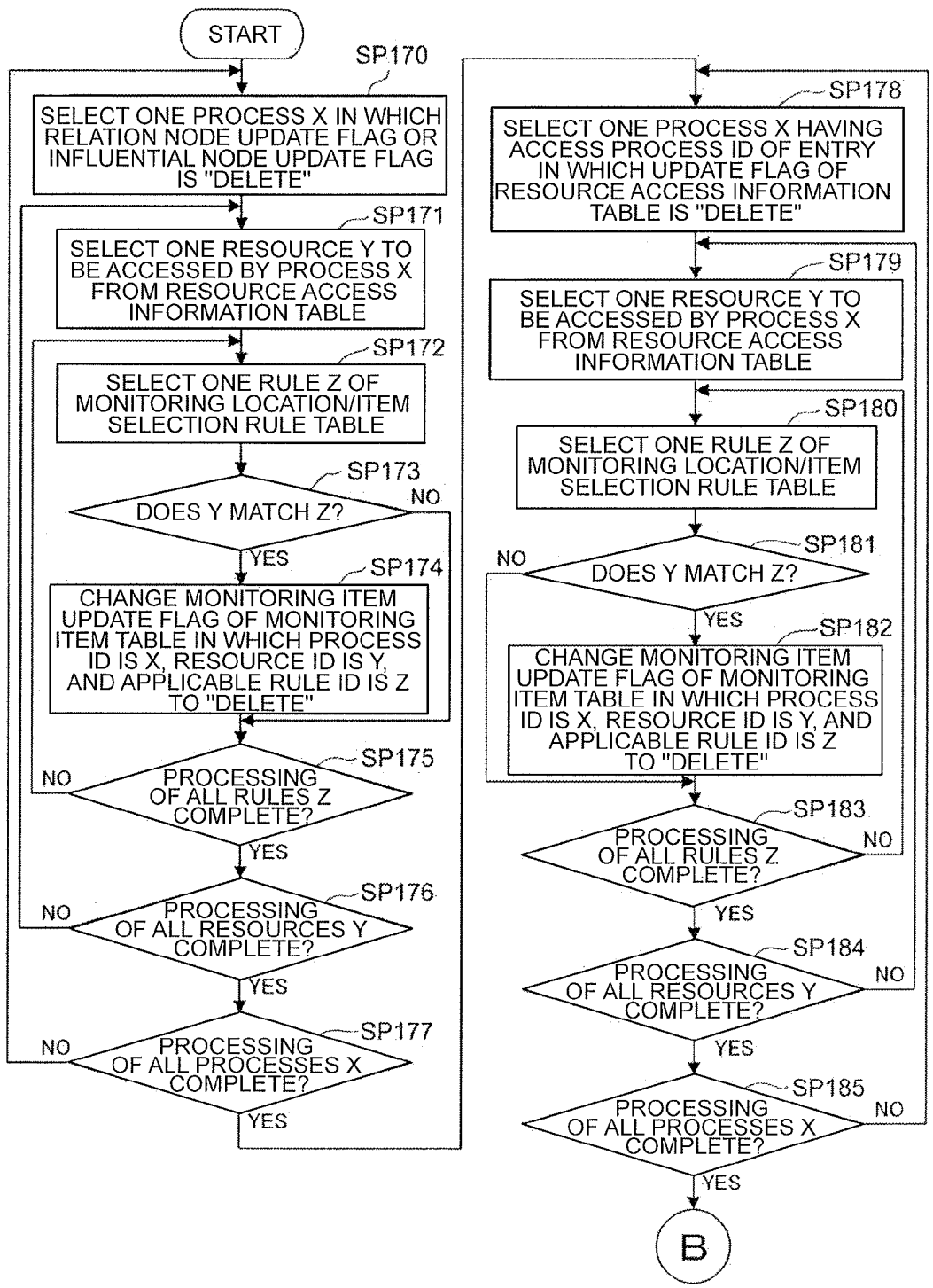
FIG. 31A is a flowchart showing the processing routine of the monitoring item generation processing.
Figure 31B:
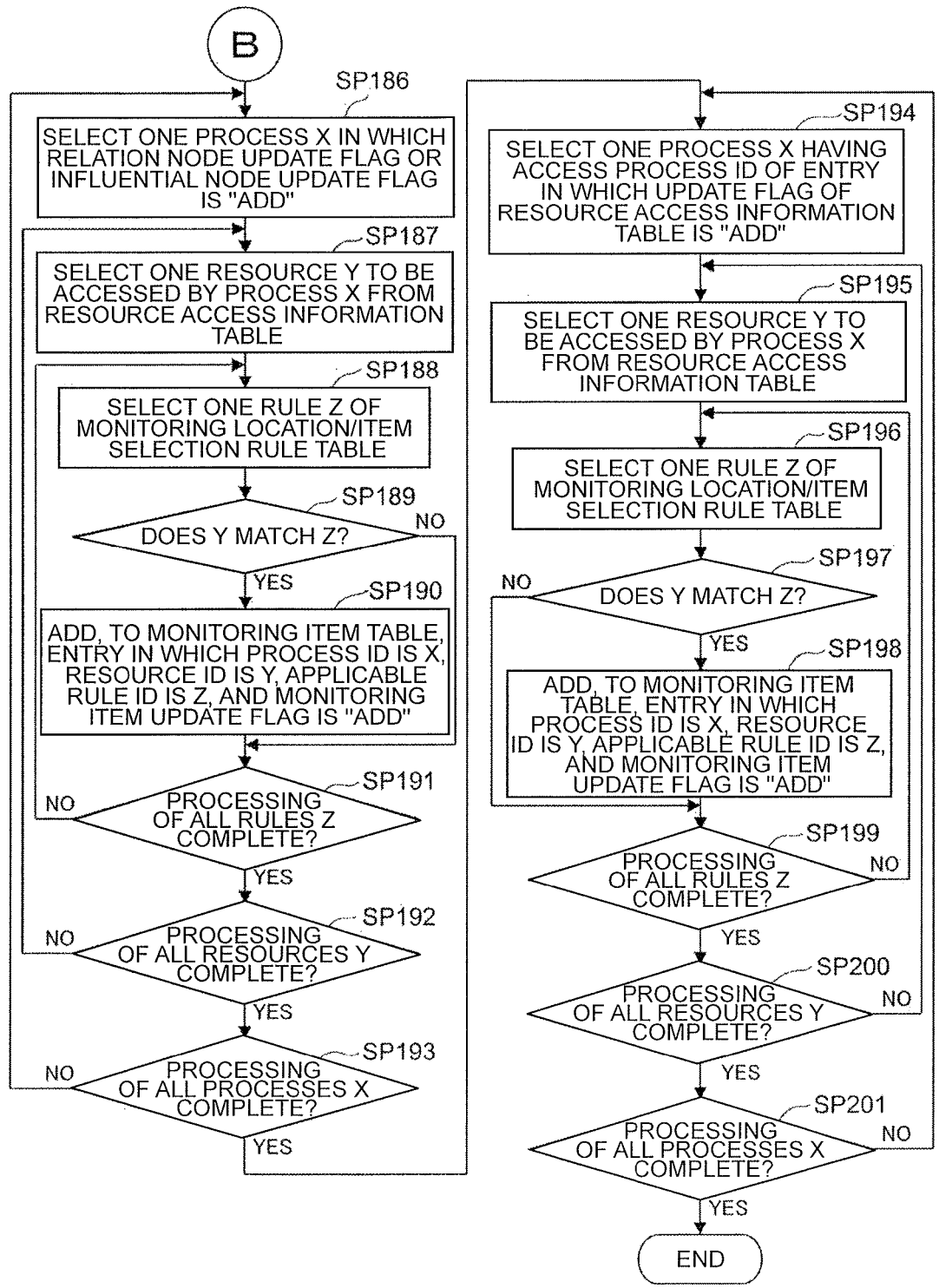
FIG. 31B is a flowchart showing the processing routine of the monitoring item generation processing.

FIG. 31A and FIG. 31B show the processing routine of the monitoring item generation processing that is executed by the monitoring item generation unit 59 in step SP93 of the monitoring item selection processing (FIG. 27) described above.

When the monitoring item generation unit 59 proceeds to step SP93 of the monitoring item selection processing, the monitoring item generation unit 59 starts the monitoring item generation processing shown in FIG. 31A and FIG. 31B, and foremost executes the processing of step SP170 to step SP185 so as to change, to "Delete", the monitoring item update flag in the monitoring item table 54 of monitoring items which are no longer to be used as monitoring items among the monitoring items of the resource that is accessed by the process 33 in which the relation node update flag or the influential node update flag in the selected relation node table 52B or the selected influential node table 52C is set to "Delete", or the process 33 that accesses the resource in the update flag in the resource access information table 47 is set to "Delete".

In effect, the monitoring item generation unit 59 performs processing, in step SP170 to step SP177, the monitoring items of the resource that is accessed by the process in which the relation node update flag or the influential node update flag in the selected relation node table 52B or the selected influential node table 52C is set to "Delete".

In other words, the monitoring item generation unit 59 selects one unprocessed process 33 in which the relation node update flag or the influential node update flag is set to "Delete" among the processes 33 registered in the selected relation node table 52B or the selected influential node table 52C (SP170).

Next, the monitoring item generation unit 59 selects one unprocessed resource that is a resource that is accessed by the process 33 selected in step SP170 (that is, a resource in which the process ID of the process 33 selected in step SP170 is stored in the access process ID column 47B of the resource access information table 47) among the resources registered in the resource access information table 47 (SP171).

Subsequently, the monitoring item generation unit 59 selects one unprocessed monitoring location/item selection rule among the monitoring location/item selection rules registered in the monitoring location/item selection rule table 53 (FIG. 11) (SP172), and determines whether the selected monitoring location/item selection rule is a rule to be applied to the resource selected in step SP171 (SP173). When the monitoring item generation unit 59 obtains a negative result in this determination, the monitoring item generation unit 59 proceeds to step SP175.

Meanwhile, when the monitoring item generation unit 59 obtains a positive result in the determination of step SP173, the monitoring item generation unit 59 detects entries, among the entries of the monitoring item table 54 (FIG. 12), in which the process ID stored in the process ID column 54B matches the process ID of the process 33 selected in step SP170, the resource ID stored in the resource ID column 54D matches the resource ID of the resource selected in step SP171, and the applicable rule ID stored in the applicable rule ID column 54F matches the monitoring location/item selection rule ID of the monitoring location/item selection rule selected in step SP172, and changes the monitoring item update flag stored in the monitoring item update flag column 54G of those entries to "Delete" (SP174).

Thereafter, the monitoring item generation unit 59 determines whether the execution of processing of step SP172 to step SP174 has been completed regarding all monitoring location/item selection rules registered in the monitoring location/item selection rule table 53 (SP175).

When the monitoring item generation unit 59 obtains a negative result in this determination, the monitoring item generation unit 59 returns to step SP172, and thereafter repeats the processing of step SP172 to step SP175.

When the monitoring item generation unit 59 obtains a positive result in step SP175 as a result of eventually completing the execution of processing of step SP172 to step SP174 regarding all monitoring location/item selection rules registered in the monitoring location/item selection rule table 53, the monitoring item generation unit 59 determines whether the execution of processing of step SP171 to step SP175 regarding all resources that are accessed by the process 33 selected in step SP170 among the resources registered in the resource access information table 47 (SP176).

When the monitoring item generation unit 59 obtains a negative result in this determination, the monitoring item generation unit 59 returns to step SP171, and thereafter repeats the processing of step SP171 to step SP176.

When the monitoring item generation unit 59 obtains a positive result in step SP176 as a result of eventually completing the execution of processing of step SP171 to step SP175 regarding all resources that are accessed by the process 33 selected in step SP170, the monitoring item generation unit 59 determines whether the execution of processing of step SP170 to step SP176 has been completed regarding all processes 33 in which the relation node update flag or the influential node update flag in the selected relation node table 52B or the selected influential node table 52C is set to "Delete" (SP177).

When the monitoring item generation unit 59 obtains a negative result in this determination, the monitoring item generation unit 59 returns to step SP170, and thereafter repeats the processing of step SP170 to step SP177.

When the monitoring item generation unit 59 obtains a positive result in step SP177 as a result of eventually completing the execution of processing of step SP170 to step SP176 regarding all processes 33 in which the relation node update flag or the influential node update flag in the selected relation node table 52B or the selected influential node table 52C is set to "Delete", the monitoring item generation unit 59 ends the processing performed to the respective processes 33 in which the relation node update flag or the influential node update flag in the selected relation node table 52B or the selected influential node table 52C is set to "Delete".

Next, the monitoring item generation unit 59 performs processing, in step SP147 to step SP153, to the monitoring items of the respective resources that are accessed by the process 33 which accesses the resource in which the update flag in the resource access information table 47 is set to "Delete".

In other words, the monitoring item generation unit 59 selects one unprocessed process 33 among the processes 33 assigned with the process ID stored in the access process ID column 47B of the entry in which the monitoring item update flag in the resource access information table 47 is set to "Delete" (SP178).

Next, the monitoring item generation unit 59 selects one unprocessed resource that is a resource that is accessed by the process 33 selected in step SP178 (that is, a resource in which the process ID of the process 33 selected in step SP178 is stored in the access process ID column 47B of the resource access information table 47) among the resources registered in the resource access information table 47 (SP178).

Subsequently, the monitoring item generation unit 59 selects one unprocessed monitoring location/item selection rule among the monitoring location/item selection rules registered in the monitoring location/item selection rule table 53 (FIG. 11) (SP180), and determines whether the selected monitoring location/item selection rule is a rule to be applied to the resource selected in step SP179 (SP181). When the monitoring item generation unit 59 obtains a negative result in this determination, the monitoring item generation unit 59 proceeds to step SP183.

Meanwhile, when the monitoring item generation unit 59 obtains a positive result in the determination of step SP181, the monitoring item generation unit 59 detects entries, among the entries of the monitoring item table 54 (FIG. 12), in which the process ID stored in the process ID column 54B matches the process ID of the process 33 selected in step SP178, the resource ID stored in the resource ID column 54D matches the resource ID of the resource selected in step SP179, and the applicable rule ID stored in the applicable rule ID column 54F matches the monitoring location/item selection rule ID of the monitoring location/item selection rule selected in step SP180, and changes the monitoring item update flag stored in the monitoring item update flag column 54G of those entries to "Delete" (SP182).

Thereafter, the monitoring item generation unit 59 determines whether the execution of processing of step SP180 to step SP182 has been completed regarding all monitoring location/item selection rules registered in the monitoring location/item selection rule table 53 (SP183).

When the monitoring item generation unit 59 obtains a negative result in this determination, the monitoring item generation unit 59 returns to step SP1802, and thereafter repeats the processing of step SP180 to step SP183.

When the monitoring item generation unit 59 obtains a positive result in step SP183 as a result of eventually completing the execution of processing of step SP180 to step SP182 regarding all monitoring location/item selection rules registered in the monitoring location/item selection rule table 53, the monitoring item generation unit 59 determines whether the execution of processing of step SP179 to step SP183 regarding all resources that are accessed by the process 33 selected in step SP178 among the resources registered in the resource access information table 47 (SP184).

When the monitoring item generation unit 59 obtains a negative result in this determination, the monitoring item generation unit 59 returns to step SP179, and thereafter repeats the processing of step SP179 to step SP184.

When the monitoring item generation unit 59 obtains a positive result in step SP184 as a result of eventually completing the execution of processing of step SP179 to step SP183 regarding all resources that are accessed by the process 33 selected in step SP178, the monitoring item generation unit 59 determines whether the execution of processing of step SP178 to step SP184 has been completed regarding all processes 33 in which the relation node update flag or the influential node update flag in the selected relation node table 52B or the selected influential node table 52C is set to "Delete" (SP185).

When the monitoring item generation unit 59 obtains a negative result in this determination, the monitoring item generation unit 59 returns to step SP178, and thereafter repeats the processing of step SP178 to step SP185.

When the monitoring item generation unit 59 obtains a positive result in step SP185 as a result of eventually completing the execution of processing of step SP178 to step SP184 regarding all processes 33 in which the relation node update flag or the influential node update flag in the selected relation node table 52B or the selected influential node table 52C is set to "Delete", the monitoring item generation unit 59 ends the processing performed to the respective processes 33 in which the update flag in the resource access information table 47 is set to "Delete".

Next, the monitoring item generation unit 59 executes the processing of step SP186 to step SP201 so as to newly register, in the monitoring item table 54, the monitoring items of the resource that is accessed by the process 33 in which the relation node update flag or the influential node update flag in the selected relation node table 52B or the selected influential node table 52C is set to "Add", or the process 33 that accesses the resource in which the update flag in the resource access information table 47 is set to "Delete".

In effect, the monitoring item generation unit 59 performs processing, in step SP186 to step SP193, to the monitoring items of the resource that is accessed by the process 33 in which the update flag in the selected relation node table 52B is set to "Add".

Note that, since the processing of step SP186 to step SP193 is the same as the processing of step SP170 to step SP177 excluding (A) and (B) below, the explanation thereof is omitted.

(A) The process selected in step SP186 is an unprocessed process 33 in which the relation node update flag or the influential node update flag in the selected relation node table 52B or the selected influential node table 52C is set to "Add".

(B) In step SP190, added to the monitoring item table 54 are entries in which the process ID of the process 33 selected in step SP186 is stored in the process ID column 54B, the resource ID of the resource selected in step SP187 is stored in the resource ID column 54D, the monitoring location/item selection rule ID of the monitoring location/item selection rule selected in step SP188 is stored in the applicable rule ID column 54F, and the monitoring item update flag stored in the monitoring item update flag column 54G is set to "Add".

Subsequently, the monitoring item generation unit 59 performs processing, in step SP194 to step SP201, to the monitoring items of the respective resources that are accessed by the process 33 that accesses the resource in which the update flag in the resource access information table 47 is set to "Add".

Note that, since the processing of step SP194 to step SP201 is the same as the processing of step SP178 to step SP185 excluding (A) and (B) below, the explanation thereof is omitted.

(A) The process 33 selected in step SP186 is a process having the same process ID as the process ID stored in the access process ID column 47B of the entry in which the update flag of the resource access information table 47 is set to "Add".

(B) In step SP198, added to the monitoring item table 54 are entries in which the process ID of the process 33 selected in step SP194 is stored in the process ID column 54B, the resource ID of the resource selected in step SP195 is stored in the resource ID column 54D, the monitoring location/item selection rule ID of the monitoring location/item selection rule selected in step SP196 is stored in the applicable rule ID column 54F, and the monitoring item update flag stored in the monitoring item update flag column 54G is set to "Add".

When the monitoring item generation unit 59 completes the processing up to step SP201, the monitoring item generation unit 59 ends the monitoring item generation processing.

(4) Effect of this Embodiment

According to the monitoring system 1 of this embodiment having the foregoing configuration, when there is any change in the relation between the processes 33 or the relation between the process 33 and the resource in the monitoring target device 2, new monitoring items are selected according to the relation between the processes 33 or the relation between the process 33 and the resource after the change without requiring any manual operation. Thus, monitoring items can be easily changed pursuant to the configuration change of the monitoring target device 2. Thus, according to the monitoring system 1, it is possible to simplify the operation and management of systems that frequently undergo configuration changes.

Moreover, with the monitoring system 1, since an update flag is raised at the locations that were updated when the operation information updating unit 41, the configuration comprehension unit 42 or the monitoring item selection unit 43 executed processing (an update flag is set to "Delete" or "Add"), and, in the subsequent processing, only the locations where the update flag is raised as a result of the previous processing are subject to processing, it is possible to dramatically reduce the computational effort when viewed from the overall series of processing. Thus, according to the monitoring system 1, the time required for the monitoring item selection processing to be performed to the monitoring target device 2 can be shortened, and it is possible to promptly change the monitoring items associated with the configuration change of the monitoring target device 2.

(5) Other Embodiments

Note that, while the foregoing embodiments described a case where the operation information updating unit 41 passively acquires operation information as the operation information acquisition unit which acquires operation information related to resources in the monitoring target devices 2 and the processes 33 from the monitoring target devices 2, the present invention is not limited thereto, and the monitoring system 1 may also be configured such that the operation information updating unit 41 dynamically acquiring the operation information from the monitoring target devices 2 by periodically or randomly accessing the respective monitoring target devices 2.

Moreover, while the foregoing embodiments described a case of applying the processes 33 as the nodes that run on the monitoring target device 2 and use the resources to execute processing, the present invention is not limited thereto, the point is that various other instances such as a thread, an OS or a cluster may be broadly applied so as long as it is an instance of an arbitrary unit that accesses the resources and a mutual relation can be derived from the operating status thereof.

In addition, while the foregoing embodiments described a case of applying only the IP address, port number and process name as the source node condition (refer to FIG. 5), the present invention is not limited thereto, and various other requirements may be used as the source node condition in addition to or substitute for the foregoing requirements.

In addition, while the foregoing embodiments described a case of where there is a direct relation between the processes 33 when the processes 33 are communicating with each other via the network 5, the present invention is not limited thereto, and, for example, it is also possible to deem that there is a direct relation between the processes 33 when they are using the same shared memory, when the processes 33 are of a parent-child relationship, or when the processes 33 are communicating with each other without going through the network 5. Moreover, the existence of a direct relation may also be defined by combining a plurality of conditions.

In addition, while the foregoing embodiments described a case of applying a volatile memory 22 as the storage medium for storing programs such as the operation information updating unit 41, the configuration comprehension unit 42 and the monitoring item selection unit 43 for realizing the monitoring item selection function of the foregoing embodiments, the present invention is not limited thereto, and as the storage medium for storing these programs, in addition to the volatile memory described above, broadly used may be, for instance, disk-shaped storage mediums such as a CD (Compact Disc), a DVD (Digital Versatile Disc), a BD (Blu-ray (registered trademark) Disc), a hard disk device or a magneto-optical disk, a nonvolatile semiconductor memory or other storage mediums.

INDUSTRIAL APPLICABILITY

The present invention can be broadly applied to monitoring systems of various configurations.

REFERENCE SIGNS LIST

1 . . . monitoring system, 2 . . . monitoring target device, 4 . . . monitoring item selection device, 11, 21 . . . CPU, 31 . . . operation information acquisition unit, 32 . . . monitoring item accumulation table, 33 . . . process, 41 . . . operation information updating unit, 42 . . . configuration comprehension unit, 43 . . . monitoring item selection unit, 44 . . . source node condition table, 45 . . . operation information accumulation table, 46 . . . node operation information table, 47 . . . resource access information table, 48 . . . configuration table, 49 . . . inter-node direct relation table, 50 . . . inter-node reachable relation table, 51 . . . monitoring item selection table, 52 . . . selected node table, 52A . . . selected source node table, 52B . . . selected relation node table, 52C . . . selected influential node table, 53 . . . monitoring location/item selection rule table, 54 . . . monitoring item table, 55 . . . inter-node relation extraction unit, 56 . . . source node searching unit, 57 . . . relation node searching unit, 58 . . . influential node searching unit, 59 . . . monitoring item generation unit.

The invention claimed is:

1. A monitoring item selection method, comprising:
periodically acquiring, by an operation information acquisition unit, operation information from a monitoring target device, wherein the operation information indicates resources of the monitoring target device and nodes that run on the monitoring target device and utilize the resources of the monitoring target device to execute processing, wherein the periodically acquiring is performed when a predetermined time period has elapsed from a prior time that operation information was received from the monitoring target device;

extracting a relation between the nodes and a relation between the nodes and the resources based on the acquired operation information;

wherein the relation between the nodes and the relation between the nodes and the resources are extracted based on only a part of the acquired operation information that was updated, and the relation between the nodes and relation between the nodes and the resources are updated based on an extraction result;

storing the acquired operation information, the extracted relation between the nodes, and the extracted relation between the nodes and the resources wherein only an updated part of the stored acquired operation information, the stored extracted relation between the nodes, and the stored extracted relation between the nodes and the resources are updated when new operation information is acquired;

on a condition that a change related to a process in the monitoring target device is determined, updating an inter-node direct relation table and an inter-node reachable relation table according to the updated part of the acquired operation information;

the monitoring item selection device selecting monitoring items of the monitoring target device based on only a part of the stored extracted relation between the nodes and stored extracted relation between the nodes and the resources that were updated and the monitoring items of the monitoring target device are selected by updating the monitoring items stored based on a selection result;

searching for a process to become a source node in the monitoring target device based at least in part on the acquired operation information by an inter-node relation extraction unit extracting the process after a configuration change and a relation between respective processes, and updating the inter-node direct relation table and the inter-node reachable relation table based on an extraction result; and sending, by the monitoring item selection device, an update to the monitoring target device relating to updated acquired operation information.

2. The monitoring item selection method according to claim 1,
wherein, selecting the monitoring items is further based on,
a node that satisfies the condition is detected as a source node,
a node having a relation with the source node is extracted as a relation node, and
the monitoring items are selected by applying rules to the resources having a relation with the source node and the relation node with regard to predetermined items to be acquired for each of the resources.

3. The monitoring item selection method according to claim 2,
wherein, in the selecting the monitoring items is further based on,
a node that accesses a same resource as the resource that is accessed by the source node and the relation node is extracted as an influential node, and the monitoring items are selected by applying rules to the resource having a relation with the influential node with regard to predetermined items to be acquired for each of the resources.

4. The monitoring item selection method according to claim 1, wherein, in the extracting utilizes,
a communication relation between the nodes is extracted as the relation between the nodes, and
an access relation between the nodes and the resources is extracted as the relation between the nodes and the resources.

5. The monitoring item selection method according to claim 4, wherein, in the extracting utilizes,
an existence of a direct communication relation is managed with a bitmap of a tournament chart format based on the operation information, and
the communication relation between the nodes is extracted by converting the bitmap into an incidence matrix, and calculating a reachable matrix of the incidence matrix.

6. The monitoring item selection method according to claim 1, wherein the node is a process.

7. A monitoring item selection device, comprising:
a memory:
a communication interface that is communicatively coupled to a monitoring target device via a network; and
a processor communicatively coupled to the memory the communication interface;
wherein the processor, having an operation information acquisition unit, periodically acquires operation information from the monitoring target device,
wherein the acquired operation information indicates resources of the monitoring target device and nodes that run on the monitoring target device and utilize the resources of the monitoring target device to execute processing, wherein the processor periodically acquires the operation information when a predetermined time period has elapsed from a prior time that operation information was received from the monitoring target device;
extracts a relation between the nodes and a relation between the nodes and the resources based on the acquired operation information;
wherein the relation between the nodes and the relation between the nodes and the resources are extracted based on only a part of the acquired operation information that was updated, and the relation between the nodes and relation between the nodes and the resources are updated based on an extraction result;
stores, in the memory, the acquired operation information, the extracted relation between the nodes, and the extracted relation between the nodes and the resources, wherein the processor stores an updated part of the stored acquired operation information, the stored extracted relation between the nodes, and the stored extracted relation between the nodes and the resources are updated when new operation information is acquired;
on a condition that a change related to a process in the monitoring target device is determined, updates an inter-node direct relation table and an inter-node reachable relation table according to the updated part of the acquired operation information; and
a monitoring item selection device selects monitoring items of the monitoring target device based on only a part of the stored extracted relation between the nodes and stored extracted relation between the nodes and the resources that were updated and the monitoring items of the monitoring target device are selected by updating the monitoring items stored based on a selection result;
searches for a process to become a source node in the monitoring target device based at least in part on the acquired operation information by an inter-node relation extraction unit extracting the process after a configuration change and a relation between respective processes, and updating the inter-node direct relation table and the inter-node reachable relation table based on an extraction result; and
sends, by the monitoring item selection device, an update to the monitoring target device relating to updated acquired operation information.

8. A non-transitory computer readable storage medium storing instructions that when executed by a processor, cause the processor to execute the method of claim 1.

* * * * *